US005488486A

United States Patent [19]

Shimizu

[11] Patent Number: 5,488,486
[45] Date of Patent: Jan. 30, 1996

[54] IMAGE PROCESSING SYSTEM

[75] Inventor: Hiromasa Shimizu, Tokyo, Japan

[73] Assignee: Ricoh Company, Ltd., Tokyo, Japan

[21] Appl. No.: 189,245

[22] Filed: Jan. 31, 1994

Related U.S. Application Data

[63] Continuation-in-part of Ser. No. 846,012, Mar. 4, 1992.

[30] Foreign Application Priority Data

Mar. 11, 1991 [JP] Japan ................................ 3-044850

[51] Int. Cl.⁶ ............................ H04N 1/393; H04N 1/41
[52] U.S. Cl. .................. 358/451; 358/261.1; 358/427
[58] Field of Search .................................... 358/451, 426, 358/261.1, 427, 261.4, 448

[56] References Cited

U.S. PATENT DOCUMENTS

| | | | |
|---|---|---|---|
| 4,468,775 | 8/1984 | Iida | 358/427 |
| 4,939,583 | 7/1990 | Tsuboi et al. | 358/427 |
| 4,992,887 | 2/1991 | Aragaki | 358/451 |
| 5,109,434 | 4/1992 | Shimizu et al. | 358/443 |

FOREIGN PATENT DOCUMENTS 0294622 12/1988 European Pat. Off. .
0407614A1 1/1991 European Pat. Off. .
63-9369 1/1988 Japan .

OTHER PUBLICATIONS

Roy Hunter and A. Harry Robinson, "International Digital Facsimile Coding Standards", Proceedings of the IEEE, vol. 68, No. 7, Jul. 1980.
Takahiko Fukinuki and Hroshi Yoshigi, "Conversion of Picture Element Density in Run–Length Domain" Central Research Laboratory, Hitachi, Ltd, IE79–60, pp. 9–14.

*Primary Examiner*—Edward L. Coles, Sr.
*Assistant Examiner*—Fan Lee
*Attorney, Agent, or Firm*—Popham, Haik, Schnobrich & Kaufman, Ltd.

[57] ABSTRACT

An image processing system for processing an image represented by run-lengths includes a first block for, when a run-length is less than a base number which is a n-th power of "2" where n is an integer, representing the run-length by one byte, and a second block for, when a run-length is equal to or greater than the base number, representing the run-length by a first part corresponding to a multiple of the base number and a second part corresponding to a value less than the base number, each of the first part and the second part being represented by one byte, wherein run-length data obtained by the first block or the second block is processed.

14 Claims, 20 Drawing Sheets

FIG. 7

(MAGNIFICATION 3/4)

| TC | INPUT RUN-LENGTH DATA | TL[TC] | TM[TC] |
|---|---|---|---|
| 0 | 0 | 0 | 0 |
| 1 | 1 | 0 | 3 |
| 2 | 2 | 1 | 2 |
| 3 | 3 | 2 | 1 |
| 4 | 4 | 3 | 0 |
| 5 | 5 | 3 | 3 |
| 6 | 6 | 4 | 2 |
| ... | ... | ... | ... |
| 62 | 62 | 46 | 2 |
| 63 | 63 | 47 | 1 |
| 64 | 64 | 48 | 0 |
| 65 | 128 | 96 | 0 |
| 66 | 192 | 144 | 0 |
| 67 | 256 | 192 | 0 |
| ... | ... | ... | ... |
| 103 | 2560 | 1920 | 0 |

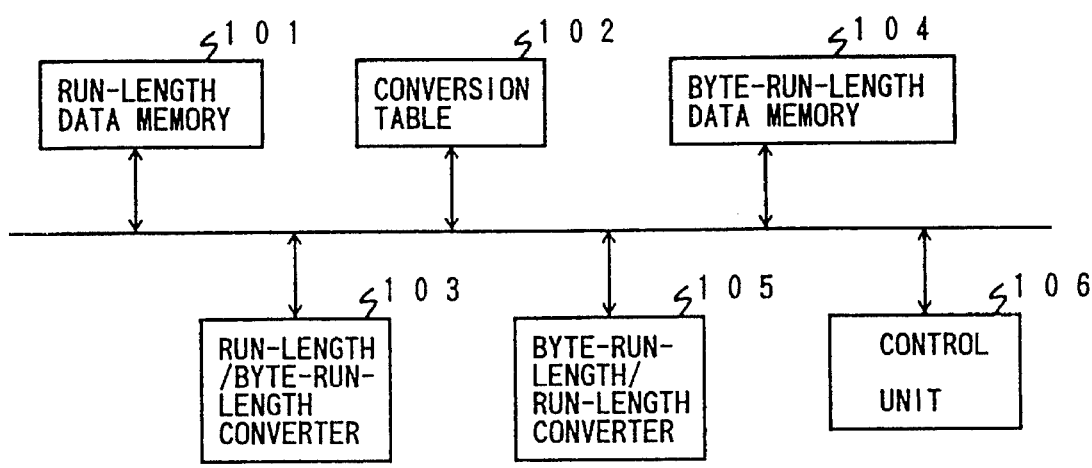
F I G. 12

FIG. 14 n/m=4/5

| INPUT BYTE-RUN-LENGTH DATA | RUN-LENGTH DATA (AL) | $S=int(\frac{4 \times AL}{5})$ | $Sf=mod(\frac{4 \times AL}{5})$ |
|---|---|---|---|
| 0 | 0 | 0 | 0 |
| 1 | 1 | 0 | 4 |
| 2 | 2 | 1 | 3 |
| 3 | 3 | 2 | 2 |
| 4 | 4 | 3 | 1 |
| 5 | 5 | 4 | 0 |
| 6 | 6 | 4 | 4 |
| 7 | 7 | 5 | 3 |
| 8 | 8 | 6 | 2 |
| ⋮ | ⋮ | ⋮ | ⋮ |
| 61 | 61 | 48 | 4 |
| 62 | 62 | 49 | 3 |
| 63 | 63 | 50 | 2 |
| 64 | 64 | 51 | 1 |
| 65 | 128 | 102 | 2 |
| 66 | 192 | 153 | 3 |
| 67 | 256 | 204 | 4 |
| 68 | 320 | 256 | 0 |
| ⋮ | ⋮ | ⋮ | ⋮ |
| 100 | 2368 | 1894 | 2 |
| 101 | 2432 | 1945 | 3 |
| 102 | 2496 | 1966 | 4 |
| 103 | 2560 | 2048 | 0 |

IMAGE PROCESSING SYSTEM

CROSS-REFERENCE TO RELATED APPLICATION

This application is continuation-in-part of the application Ser. No. 07/846,012 filed on Mar. 4, 1992, for IMAGE DATA CONVERSION UNIT HAVING FUNCTION FOR VARYING IMAGE SIZE.

BACKGROUND OF THE INVENTION

1. Field of the Invention

The present invention is generally related to an image processing system, and more particularly to an image processing system for processing an image processed by run-lengths.

2. Description of the Related Art

In a image transmission apparatus, such as a facsimile machine, image signals read by an image sensor are converted into binary data, the binary data is coded in accordance with a coding method, such as an MH (Modified Huffman) method or an MR (Modified Read) method, and the coded data is transmitted to a receiver via a communication line. In the receiver, the coded data is decoded into a binary image data, and an original image is reproduced from the binary data and recorded on a recording medium (e.g. a recording paper).

A conventional image processing unit is formed, for example, as shown in FIG.1. Referring to FIG. 1, an image processing unit has a CPU 50, a memory 51, a coder/decoder 52, a magnification processing unit 53 and an interface circuit 54 all of which are connected to each other by a system bus. The coder/decoder 52 codes binary data into a code (e.g. the MH code or MR code), and decodes the code into binary data. The magnification processing unit 53 processes binary data so that an image size is changed. The interface circuit 54 is coupled to a printer, a transmitter unit, and a receiver unit in a facsimile.

In a case where a size of an original in the transmitter differs from a size of a recording paper on which an original image should be recorded, the magnification processing unit 53 of transmitter carries out a process in which a size of an image represented by the binary data is changed so that the image can be recorded on the recording paper in the receiver. This process is referred to as a size changing process or a pixel (picture element) density conversion process. In a conventional facsimile machine, a reducing process of an image is, as the pixel density conversion process, mainly performed. Reducing processes in accordance with a logical sum method and a thinning out method have been proposed. However, lines of character images processed by the conventional reducing process are not clear or cut, so that the quality of an image deteriorates.

To eliminate the above disadvantages, a method for converting a pixel density in a run-length domain has been proposed (Electronics and Communication Society Technical Report IE79-60 pp9–14). However, since, in this method, a computing of all input run-lengths must be carried out, amount of computing becomes large.

It has been known that each MH code processed in a facsimile machine is formed of a Terminating code in a case where a run-length represented by each MH code is in a range from 0 to 63, and is formed of Make up code and Terminating code in a case where a run-length represented by each MH code is in a range from 64 to 2560. Thus, 16 bits are needed to process each run-length, so that a size of a memory used to convert the pixel density in the run-length domain becomes large. Furthermore, the run-length data is not an appropriate size for a digital processing unit in which data is processed byte by byte.

SUMMARY OF THE INVENTION

Accordingly, a general object of the present invention is to provide a novel and useful image processing unit in which the disadvantages of the aforementioned prior art are eliminated.

A specific object of the present invention is to provide an image processing unit in which each run-length representing an image can be processed by byte by byte so that capacity of a memory can be reduced.

Another object of the present invention is to provide an image processing unit in which coding of image data and size changing of an image can be effectively performed.

The above objects of the present invention are achieved by an image processing system for processing an image represented by run-lengths, said system comprising: first means for, when a run-length is less than a base number which is a n-th power of "2" where n is an integer, representing the run-length by using a predetermined formula; and second means for, when a run-length is equal to or greater than the base number, representing the run-length by a first part corresponding to a multiple of the base number and a second part corresponding to a value less than the base number, each of the first part and the second part being represented by using the predetermined formula, wherein run-length data obtained by said first means or said second means is processed.

According to the present invention, a run-length having a value less than the base number (e.g.64) is represented by the predetermined formula (e.g. one byte) and a run-length having a value equal to or greater than the base number is represented by the first part corresponding to a multiple of the base number and a second part corresponding to a value less than the base number, each of the first part and the second part being represented by using the predetermined formula (e.g. one byte). Thus, all run-lengths can be processed by using the predetermined formula by which a run-length having a value less than the base number is represented. That is, all run-lengths can be processed, for example, byte by byte. In addition, in a case where the predetermined formula corresponds to a coding formula (e.g. the MH code), the processed image data can be easily converted into the code.

Additional objects, features and advantages of the present invention will become apparent from the following detailed description when read in conjunction with the accompanying drawings.

BRIEF DESCRIPTION OF THE DRAWINGS

FIG. 7 is a diagram illustrating an example of the run-length conversion table.

FIG. 12 is a block diagram illustrating an image processing unit according to another embodiment of the present invention.

FIG. 14 is a diagram illustrating another example of the run-length conversion table.

DESCRIPTION OF THE PREFERRED EMBODIMENTS

A description will now be given of an embodiment of the present invention.

Figure 1:
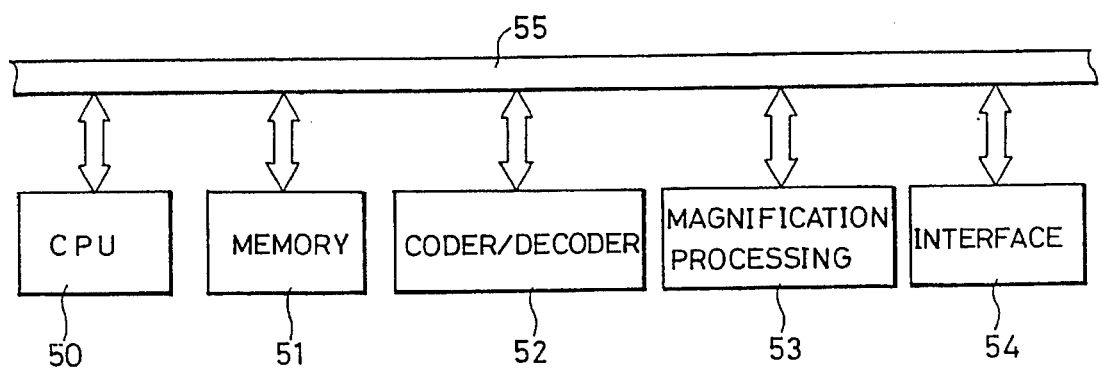
FIG. 1 is a block diagram illustrating a conventional image processing unit included in a facsimile machine.
Figure 2:
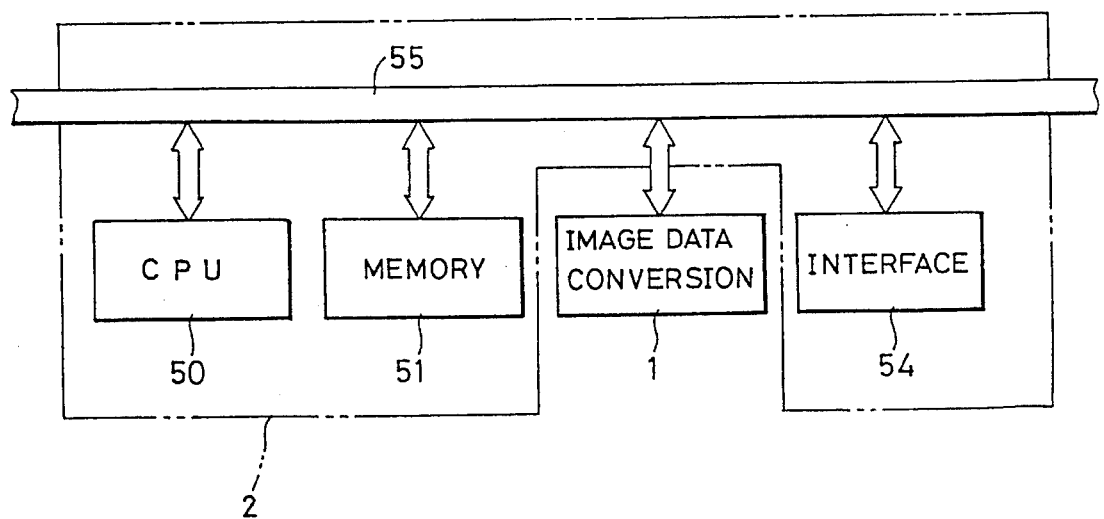
FIG. 2 is a block diagram illustrating an image processing unit according to an embodiment of the present invention.

Referring to FIG. 2, which shows an image processing part of a facsimile machine, this image processing part has the CPU 50, the memory 51 and the interface circuit 54 all of which are connected to each other by the system bus 55, in the same manner as conventional one shown in FIG. 1. The image processing part also has an image data conversion unit 1 connected to the system bus 55. Image data to be processed by the image data conversion unit 1 includes binary dot data directly representing an image dot by dot (including white dots and black dots), run-length data representing a number of successive white or black dots in the binary dot data and code data such as MH code, MR code or MMR code.

Figure 3:
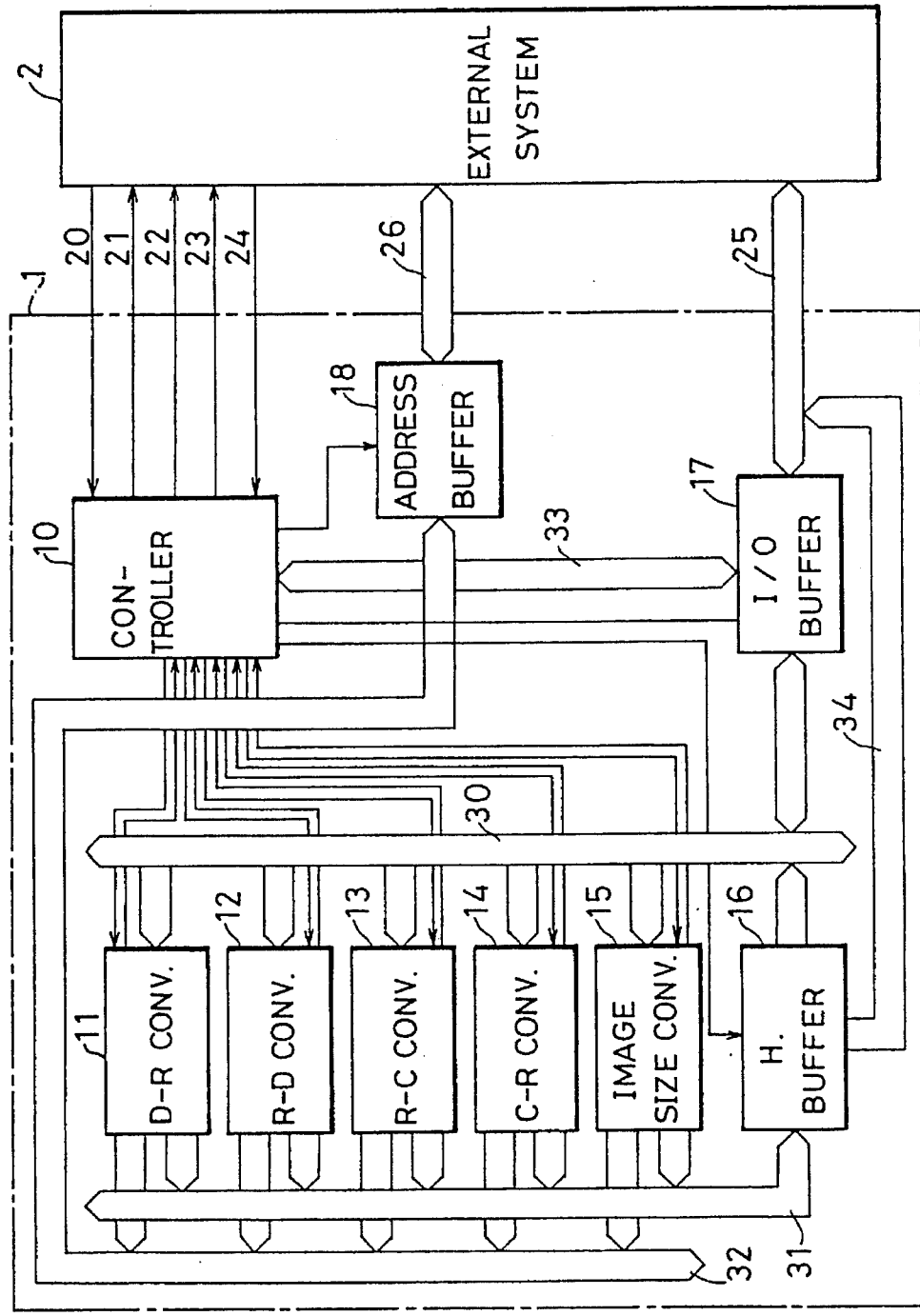
FIG. 3 is a detailed circuit diagram illustrating an image data conversion unit included in the image processing unit shown in FIG. 2.

The image conversion unit 1 is formed as shown in FIG. 3.

Referring to FIG. 3, the image data conversion unit 1 is connected to an external system 2. The external system 2 corresponds to a computer system including the CPU 50, the memory 51 and the interface circuit 54 which are connected by the system bus 55, as shown by a chain line in FIG. 2. The image data conversion unit 1 has a conversion controller 10 for controlling respective parts of the image data conversion unit 1 in accordance with instructions supplied from the external system 2. The image data conversion unit 1 also has a D-to-R converter 11, an R-to-D converter 12, an R-to-C converter 13, a C-to-R converter 14 and an image size converter 15. The D-to-R converter 11 converts binary dot data into run-length data. The R-to-D converter 12 converts run-length data into binary dot data. The R-to-C converter 13 converts run-length data into code. The C-to-R converter 14 converts code into run-length data. The image size converter 15 carries out a process for enlarging or reducing an image. The image data conversion unit 1 further also has a holding buffer 16, an input-output buffer 17 and an address buffer 18. The holding buffer 16 is used for temporarily storing image data output from each of the converters 11, 12, 13, 14 and 15 and intermediate data. The input-output buffer 17 is used for transmitting to and receiving from the external system 2 image data. The address buffer 18 is used for transmitting address data to the external system 2. The respective converters 11, 12, 13, 14, and 15 are connected to the input-output buffer 17 by an input bus 30 so that the image data is supplied from the input-output buffer 17 to a selected one of the converters 11, 12, 13, 14 and 15 via the input bus 30. The converters 11, 12, 13, 14 and 15 are also connected to the holding buffer 16 by an output bus 31 so that image data output from each of the converters 11, 12, 13, 14 and 15 is supplied to the holding buffer 16 via the converting output bus 31. The image data stored in the holding buffer 16 can be refed, to each of the converters 11, 12, 13, 14 and 15, via the input bus 30. The address buffer 18 is connected to the converters 11, 12, 13, 14 and 15 via an address bus 32. Control lines 20–24, an external data bus 25 and an external address bus 26 are provided between the image data conversion unit 1 and the external system 2. The control lines 20–24 connect the conversion controller 10 of the image data conversion unit 1 to the external system 2, so that control signals are transmitted between the conversion controller 10 and the external system 2 via the control lines 20–24. The external data bus 25 connects the input-output buffer 17 of the image data conversion unit 1 to the external system 2, so that image data, instruction data and other such data are transmitted between the input-output buffer 17 and the external system 2 via the external data bus 25. The external address bus 26 connects the address buffer 18 of the image data conversion unit 1 to the external system 2, so that address data is transmitted between the address buffer 18 and the external system 2 via the external address bus 26. A control signal representing transmission of instructions or of the image data is transmitted from the external system 2 to the image data conversion unit 1 via the control line 20. A control signal representing transmission of instructions or of the image data is transmitted from the image data conversion unit 1 to the external system 2 via the control line 21. A control signal representing whether data transmitted from the image data conversion unit 1 to the external system 2 represents a conversion state or converted data passes from the image data conversion unit 1, through the control line 22, to the external system 2. A control signal, used for directing the external system 2 to operate in a DMA mode or non-DMA mode, passes from the image data conversion unit 1, through the control line 23, to the external system 2. A control signal representing whether data transmitted from the external system 2 to the image data conversion unit 1 is instruction data or image data passes through the control line 24. The holding buffer 16 is connected to the external data bus 25 by an internal data bus 34.

In the above image processing part of the facsimile machine, processes are carried out as follows.

The conversion controller 10 selects either a first mode in which the image data for one page is converted or a second mode in which the image data for a part of one page is converted, and one of the converter 11, 12, 13, 14 and 15, based on instruction data supplied from the external system 2 to the conversion controller 10 via the external data bus 25, the input-output buffer 17 and the instruction bus 33. Then the conversion controller 10 requires a transmission, to the external system 2, of image data to be converted. After the image data is transmitted from the external system 2 to the input-output buffer 17 via the external data bus 25, the image data stored in the input-output buffer 17 is supplied, in accordance with a control of the conversion controller 10, to the selected one of the converters 11, 12, 13, 14 and 15 via the conversion input bus 30. When a conversion process in the selected one of the converters 11, 12, 13, 14 and 15 is completed, converted image data is supplied to the holding buffer 16 via the conversion output bus 31, so that the converted image data is stored in the holding buffer 16.

In a case where the instruction from the external system 2 represents single conversion process, the converted image data stored in the holding buffer 16 is supplied to the external data bus 25 via the internal data bus 34, so that the converted image is transmitted to the external system 2. In a case where the instruction from the external system 2 represents a plurality of conversion processes, image data is repeatedly supplied to selected converters from among the converters 11, 12, 13, 14, and 15 via the holding buffer 16. The image data conversion unit 1 has the following five conversion modes.

In the first mode, binary dot data is converted into run-length dot by the D-to-R converter 11. In the second mode, run-length data is converted into binary dot data by the R-to-D converter 12. In the third mode, run-length data is converted into code (e.g. the MH code) by the R-to-C converter 13. In the fourth mode, code (MH code) is converted into run-length data by the C-to-R converter 14. In the fifth mode, run-length data is converted into another run-length data in the image size converter 15.

For example, in a case where an original image on an A4 size document is reduced to an image on an B5 size sheet, and then the reduced image is transmitted to a receiver, the binary dot data corresponding to the original image is converted into the run-length data by the D-to-R converter 11, and then the run-length data is converted into run-length data corresponding to the reduced image by the image size converter 15. Further, the run-length data corresponding to the reduced image is converted into MH code by the R-to-C converter 13. Then the MH code corresponding to the reduced image is transmitted to the receiver. That is, the image size converter 15 processes the run-length data so as to vary a size of the image represented by the binary dot data.

Figure 4:
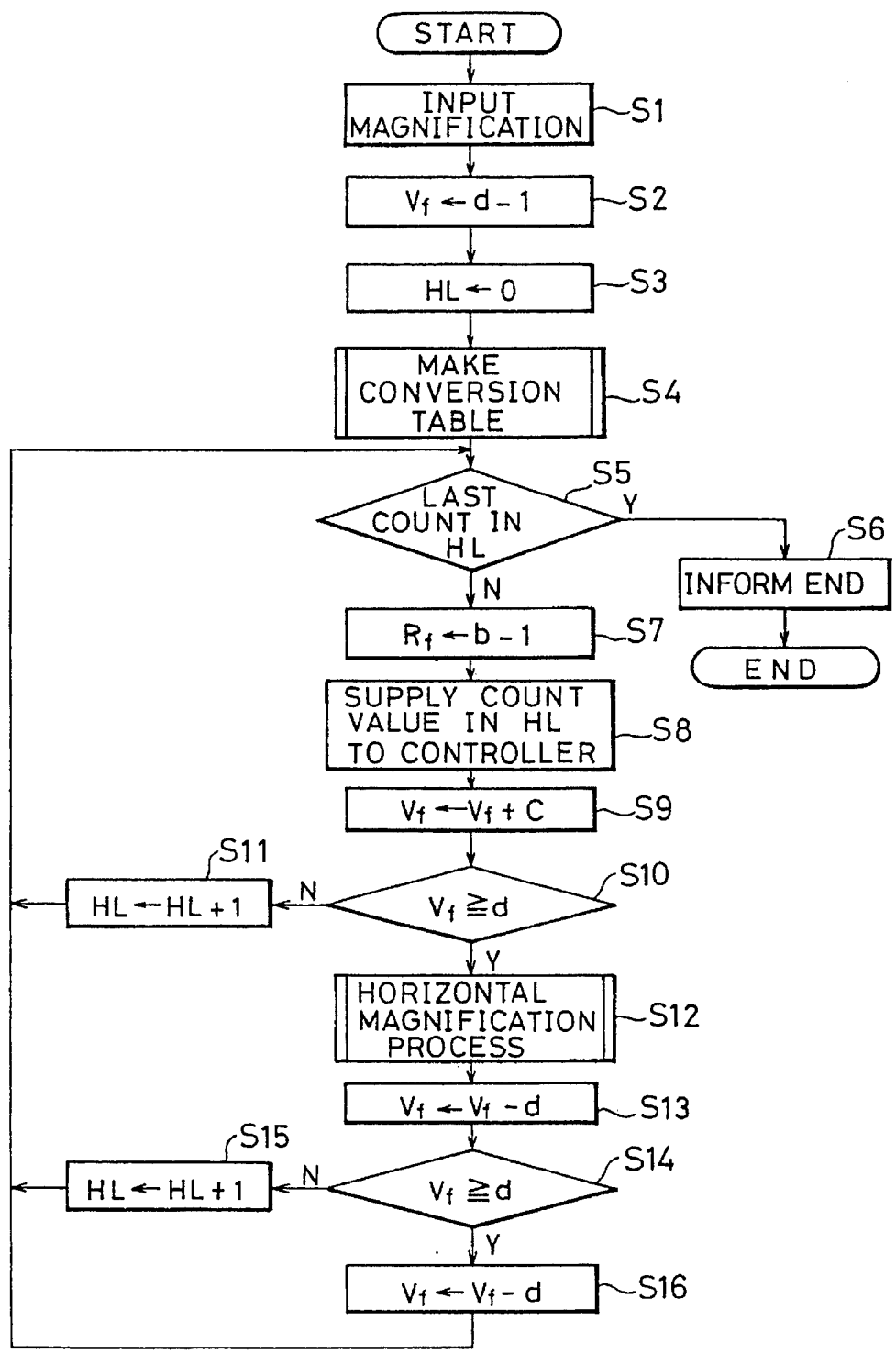
FIG. 4 is a flow chart illustrating a process for changing an image size.

The image size converter 15 carries out a process in accordance with a flow chart shown in FIG. 4.

A horizontal size magnification "a/b" and a vertical size magnification "c/d" are supplied from the conversion controller 10 to the image size converter 15. Each line image represented by run-length data is enlarged or reduced based on the horizontal size magnification "a/b". Images formed of a plurality of line images, each represented by the run-length data, are enlarged or reduced based on the vertical size magnification "c/d" in a direction perpendicular to each line image.

Referring to FIG. 4, step S1 stores, in an internal register, a numerator "a" and a denominator "b" for defining the horizontal size magnification "a/b", and a numerator "c" and a denominator "d" for defining the vertical size magnification "c/d". Step S2 subtracts one from the denominator "d" of the vertical size magnification and sets the subtracted value (d−1) in a vertical fraction register Vf (Vf← d−1). Step S3 resets a horizontal line counter HL to zero (HL←0). Then step S4 makes a run-length conversion table. The run-length conversion table represents relationships between the input run-length data and converted run-length data calculated based on the horizontal size magnification "a/b". It will be described later how the run-length conversion table is made.

After this, step S5 determines whether or not the horizontal line counter HL has reached a value corresponding to an end line of an image for one page. When step S5 determines that the horizontal counter HL has reached the value corresponding to the end line of the image for one page, step S6 informs the conversion controller 10 of an end of process for converting a size of image for one page.

On the other hand, when step S5 determines that the horizontal counter HL has not reached the value corresponding to the end line of the image for one page, step S7 subtracts one from the denominator "b" of the horizontal size magnification and sets the subtracted value (b−1) in a run-length fraction accumulator Rf. Then step S8 informs the conversion controller 10 of the count value in the horizontal counter HL. The conversion controller 10 uses the count value in the horizontal counter HL in a horizontal magnification process which will be described later. After step S8, step S9 adds the numerator "c" of the horizontal size magnification to the vertical fraction register Vf (Vf←Vf+c). Step S10 determines whether or not a value in the vertical fraction register Vf is equal to or greater than the denominator "d" of the vertical size magnification. When the value in the vertical fraction register Vf is less than the denominator "d" of the vertical size magnification, step S11 increments the horizontal counter HL by one and the process returns to step S5. Alternatively, when the value in the vertical fraction register Vf is equal to or greater than the denominator of the vertical size magnification, the process proceeds to step S12.

Step S12 carries out a horizontal magnification process. In the horizontal magnification process, run-length data representing a line image specified by the count value in the horizontal counter HL is read from the external system 2 or the holding buffer 16, and then the run-length data is processed byte by byte so that converted run-length data representing an enlarged or reduced line image is obtained. A detailed description of the horizontal magnification process will be given later.

After step S12, step S13 subtracts the denominator "d" of the vertical size magnification from the vertical fraction register Vf (Vf←Vf−d). Then step S14 determines whether of not a value in the vertical fraction register Vf is equal to or greater than the denominator "d" of the vertical size magnification. When step S14 determines that the value in the vertical fraction register Vf is less than the denominator "d" of the vertical size magnification (Vf<d), step S15 increments the horizontal counter HL by one and then the process returns to step S5. Alternatively, when step S14 determines that the value in the vertical fraction register Vf is equal to or greater than the denominator "d" of the vertical size magnification (Vf≧d), step S16 subtracts the denominator "d" of the vertical size magnification from the vertical fraction register Vf (Vf←Vf−d). After this, the process returns to step S5.

When the numerator "c" is less that the denominator "d", the vertical magnification "c/d" is less than 1. That is, in this case, an image is reduced in a direction perpendicular to each line in the ratio of c to d. In the process shown in FIG. 4, while step S10 is repeatedly carried out d times, step S10 determines (d-c) times that the vertical fraction register Vf is less than the denominator d. Thus, the horizontal magnification process in step S12 is canceled for a quantity of lines in the ratio of (d-c) to d, so that (d-c) line images are removed from d line images. That is, image lines ate removed from an original image in the ratio of (d-c) to d, so that the original image is reduced in a direction perpendicular to each line in the ratio of c to d.

When the vertical magnification "c/d" is set to, for example, "¾", the process is carried out as follows.

The numerator "3" of the vertical magnification and the denominator "4" thereof are set in the internal register, in step S1. Then a value "3" obtained by subtracting 1 from the denominator "4" is set in the vertical fraction register Vf.

On the first line (HL=1), the numerator "3" is added to the vertical fraction register Vf, so that a value "6" is set in the vertical fraction register Vf, in step S9. Since the value "6" in the vertical fraction register Vf is greater than the denominator "4", the horizontal magnification process is carried out with respect to the first line, in step S12. After the horizontal magnification process in step S12, the denominator "4" is subtracted from the value "6" in the vertical fraction register Vf, so that a value "2" is set in the vertical fraction register Vf, in step S13. Since the value "2" in the vertical fraction register Vf is less than the denominator "4", the horizontal counter HL is incremented by one, in step S15, so that 1 is set in the horizontal counter HL (HL=1). Then the process returns to step S5.

On the second line (HL=2), the numerator "3" is added to the vertical fraction register Vf in step S9, so that a value "5" is set in the vertical fraction register Vf. Since the value "5" is greater than the denominator "4", the horizontal magnification process is carried out with respect to the second line, in step S12. The denominator "4" is subtracted from the value "5" in the vertical fraction register Vf, so that a value "1" is set in the vertical fraction register Vf, in step S13. Then, the horizontal counter HL is incremented by one (HL=2), and the process returns to step S5.

On the third line (HL=3), the numerator "3" is added to the vertical fraction register Vf, so that a value "4" is set in the vertical fraction register Vf, in step S9. Since the value "4" in the vertical fraction register Vf is equal to the denominator "4", the horizontal magnification process with respect to the third line is carried out, in step S12. The denominator "4" is subtracted from the vertical fraction register Vf, so that a value "0" is set in the vertical fraction register Vf, in step 13. Then the horizontal counter HL is incremented by one (HL=3), and the process returns to step S5.

On the fourth line (HL=4), the numerator "3" is added to the vertical fraction register Vf, so that a value "3" is set in the vertical fraction register Vf, in step S9. In this case, as the value "3" is less than the denominator "4", the horizontal process with respect to the fourth line is canceled. Then, the horizontal counter HL is incremented by one (HL=4), and the process returns to step S5. That is, the fourth line is removed from an original image. Then, the horizontal counter HL is incremented by one (HL=4), and the process returns to step S5.

On the fifth line (HL=5), the numerator "3" is added to the vertical fraction register Vf, so that a value "6" is set in the vertical fraction register Vf, in step S9. The value "6" in the vertical fraction register is equal to that set therein on the first line. Thus, after this, the same processes as those performed on the first through the forth lines are repeatedly carried out on the rest of the image, so that the original image is reduced in a direction perpendicular to each line (a vertical direction) in the ratio of 3 to 4.

When the numerator "c" is greater than the denominator "d" the vertical magnification "c/d" is greater than 1. That is, in this case, an image is enlarged in a direction perpendicular to each line in the ratio of c to d. In the process shown in FIG. 4, while step S14 is repeatedly carried out c times, step S14 determines (c-d) times that vertical fraction register Vf is equal to or greater than the denominator d. Thus, the horizontal magnification process in step S12 is carried out without increment of the horizontal counter HL in the ratio of (c-d) to c. That is, the horizontal magnification process is carried out twice with respect to the same line in the ratio of (c-d) to c, so that a quantity of new image lines are added to an original image in the ratio of (c-d) to c. As a result, the original image is magnified c/d times in a direction perpendicular to each line.

A description will now be given of a process for making the run-length conversion table, which carried out in step S4.

Figure 5:
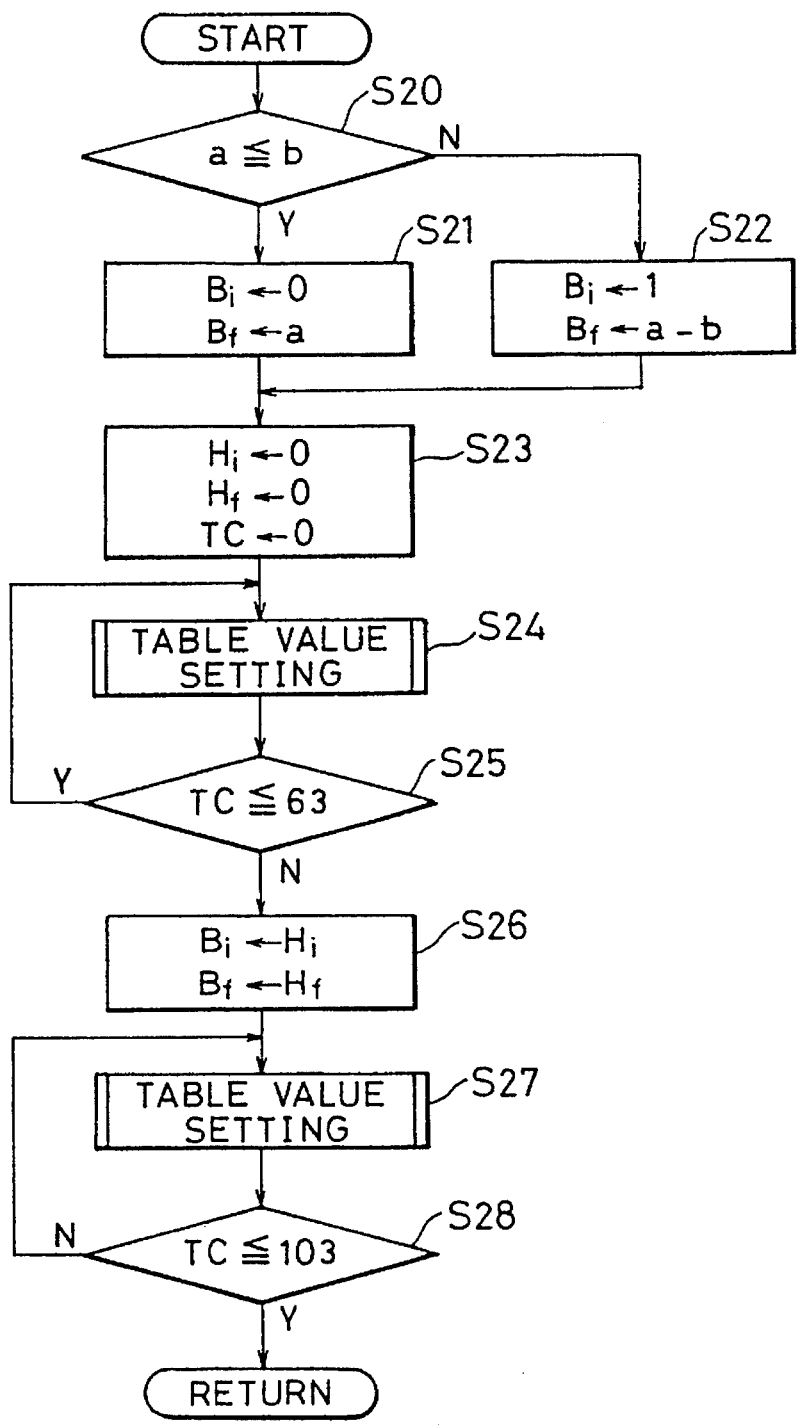
FIG. 5 is a flow chart illustrating a process for making a run-length conversion table.

The process in step S4 is carried out in accordance with a flow chart shown in FIG. 5.

Referring to FIG. 5, step S20 determines whether or not the numerator "a" of the horizontal magnification is less than the denominator "d" thereof. When the horizontal magnification is set to a value equal to or less than 1 (reduction), the process proceeds from step S20 to step S21. Alternatively, when the horizontal magnification is set to a value greater than 1 (enlargement), the process proceeds from step S20 to step S22. Step 21 sets a value "0" in a basic run-length register Bi (Bi=0) and the numerator "a" in a basic fraction register Bf (Bf=a). Step 22 sets a value "1" in the basic run-length register Bi (Bi=1) and a difference "a-b" in the basic fraction register Bf (Bf=a-b). For example, in a case where the horizontal magnification is set to "¾", the value "0" is set in the basic run-length register Bi (Bi=0) and "3" is set in the basic fraction register Bf (Bf=3). In a case where the horizontal magnification is set to "⅞", the value "1" is set in the basic run-length register Bi (Bi=1) and "2" is set in the basic fraction register Bf(Bf=2). The value set in the basic run-length register Bi corresponds to a quotient in a calculation of a/b. The value in the basic fraction register Bf corresponds to a residual in the calculation of a/b.

Then step S23 initializes a horizontal run-length register Hi, a horizontal fraction register Hf and table counter TC to "0". After step S23, step S24 carries out a table value setting process. In the table value setting process, an input run-length is magnified a/b times, so that converted run-length value TL[TC] and fraction value TM[TC] are obtained. A detailed description of the table value setting process will be given later. After the table value setting process in step S23, step S25 determines whether or not a count value in table counter TC exceeds "63". Then until step S25 determines that a count value in the table counter TC exceeds "63", the table value setting process in step S25 is repeatedly carried out. The run-length data is represented by using a multiple of 64 and a number falling within a range of 0–63. Thus, step S24 calculates each table value corresponding to a number falling within a range of 0–63 in the input run-length data.

When the count value in the table counter TC exceeds "63", a value in the horizontal run-length register Hi is set in the basic run-length register Bi and a value in the horizontal fraction register Hf is set in the basic fraction register Bf, in step S26. After that, until the count value in the table counter TC exceeds "103", the table value setting process in step S27 is repeatedly carried out. Step S27 calculates each table value corresponding to the multiple of 64 in the input run-length data.

The run-length data represented by (M T) has a value L calculated in accordance with the following formula:

$$L = M + T$$

where M is the multiple of 64, and T is the number falling within a range of 0–63.

A description will now be given of the table value setting process in steps S24 and S27, in a case where the horizontal magnification "a/b" is set to ¾ (reduction), with reference FIG. 6.

Step S30 sets the converted run-length value TL[TC] to a value in the horizontal run-length register Hi and the converted fraction value TM[TC] to a value in the horizontal fraction register Hf. When the count value in the table counter TC is equal to "0" (TC=0), the value in the horizontal run-length register Hi is "0" (Hi=0) and the value in the horizontal fraction register Hf is "0" (Hf=0). That is, the converted run-length value TL[TC=0] and the converted fraction value TM[TC=0] are respectively set to "0". Step 31 adds the value in the basic run-length register Bi to the value in the horizontal run-length register Hi and sets the obtained value in the horizontal run-length register Hi (Hi–Hi+Bi). Step 31 also adds the value in the basic fraction register Bf to the value in the horizontal fraction register Hf, and set the obtained value in the horizontal fraction register Hf (Hf–Hf+Bf). In this case, as Hi=0, Hf=0 and Bf=3, the value in the horizontal run-length is equal to "0" (Hi=0), and the value in the horizontal fraction register is equal to "3" (Hf=3).

After this, step S32 determines whether or not the value in the horizontal fraction register Hf exceeds the denominator "b" of the horizontal magnification "a/b". When the value in the horizontal fraction register Hf is equal to or greater than the denominator "b", step S33 adds one to the horizontal run-length register Hi and sets the obtained value in the horizontal run-length register Hi (Hi←Hi+1). In addition, step S33 subtracts the denominator "b" from the value in the horizontal fraction register Hf and sets a value obtained through the subtraction in the horizontal fraction register Hf (Hf←Hf–b). Then step S34 increments the count value in the table counter TC by one (TC←TC+1). Alternatively, when the value in the horizontal fraction register Hf is less than the denominator "b", the process proceeds directly from step S32 to step S34 so that step S33 is omitted. In this case, as Hf=3, b=4, step S33 is omitted.

When the count value in the table counter TC is equal to 1 (TC=1), the value in the horizontal run-length register Hi is equal to "0" (Hi=0), and the value in the horizontal fraction register Hf is equal to "3" (Hf=3). Thus, the converted run-length TL[TC=1] is set to "0" and the converted fraction value TM[TC=1] is set to "3". After that, until the count value in the table counter S34 reaches "63", the process as described above is repeatedly carried out. As a result, the converted run-length value TL and the converted fraction values TM, in a case where the count value in the table counter TC falls within a range of 0–63, are as shown in FIG. 7.

When the count value in the table counter TC reaches 64 (TC=64), the process proceeds from step S25 to step S26, in FIG. 5. Then, in step S26, a value in the horizontal run-length register Hi is set in the basic run-length register Bi, and a value in the horizontal fraction register Hf is set in the basic fraction register Bf. In this case, the value "48" has been set in the horizontal run-length register Hi and the value "0" is set in the horizontal fraction register Hf when the table value setting process in step S24 is finished. Thus, the value "48" is set in the basic run-length register Bi and the value "0" is set in the basic fraction register Bf, in step S26.

Figure 6:
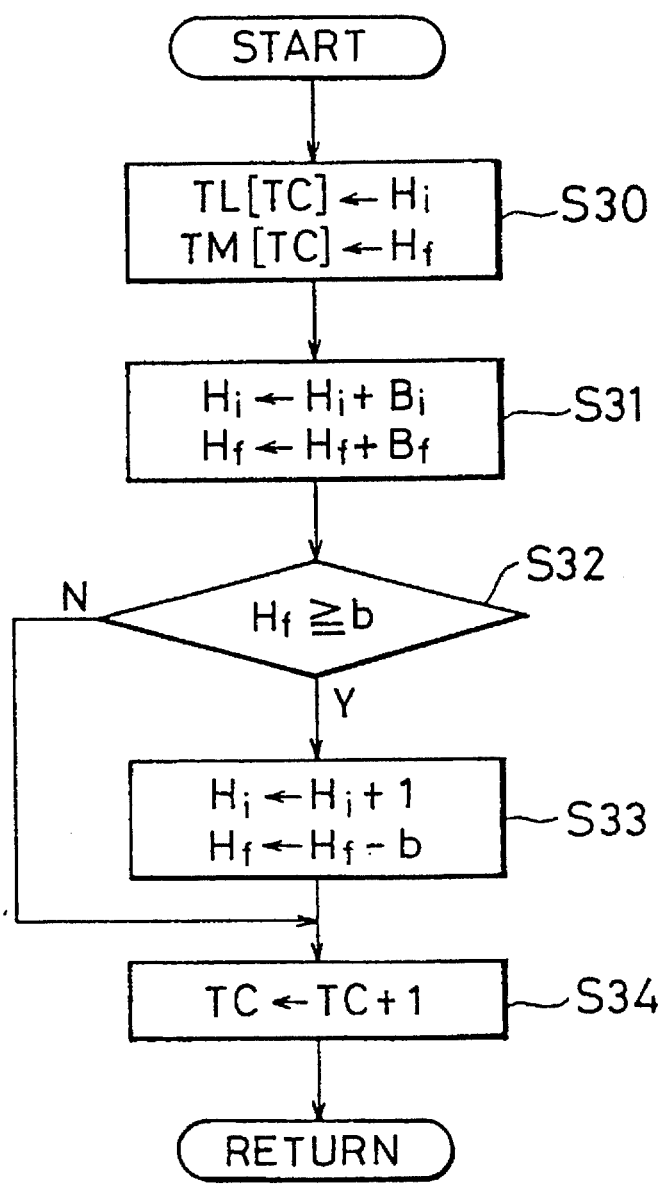
FIG. 6 is a flow chart illustrating a process for setting a table value in the run-length conversion table.

Then, in the table value setting process in step S27, step 30 shown in FIG. 6 sets the converted run-length value TL[TC=64] to "48" and sets the converted fraction value TM[TC=64] to "0". Step S31 adds the value "48" in the basic run-length register Bi to the value "48" in the horizontal run-length register Hi, and sets the additional value "96" in the horizontal run-length register Hi. Step S31 also adds the value "0" in the basic fraction register Bf to the value "0" in the horizontal fraction register Hf, and sets the obtained value "0" to the horizontal fraction register Hf. Then, the count value in the table counter TC is incremented by one so as to become "65", in step S34. After this, the process as described above is repeatedly carried Out until the count value in the table counter TC exceeds "103". Thus, when the table value setting process in step S27 is finished, the converted run-length values TL corresponding to the multiple of 64 in the run-length, in a case where the count value in the table counter TC falls within a range of 64–103, are obtained as shown in FIG. 7. In the run-length conversion table shown in FIG. 7, the fraction value TM is always equal to "0" when the count value in the table counter falls within a range of 64–103. The run-length conversion table made in accordance with the process shown in FIGS. 5 and 6 is stored in a memory provided in the image size converter 15.

A description will now be given of the horizontal magnification process carried out in step S12 shown in FIG. 4, with reference to FIGS. 8 and 9.

In the horizontal magnification process, run-length data on a line specified by the horizontal line counter HL is processed byte by byte so that an image on the specified line is enlarged or reduced. The run-length data is represented by a multiple (M) of 64 and the number (T) falling within a range of 0–63. The multiple (M) of 64 is represented by 1 byte (8 bits), and a number (T) falling within a range of 0–63 is represented by 1 byte (8 bits). Thus, the run-length less than 64 is represented by 1 byte, and the run-length equal to or greater than 63 is represented by 2 bytes in which the multiple (M) and the number (T) are arranged in this order.

Figure 8:
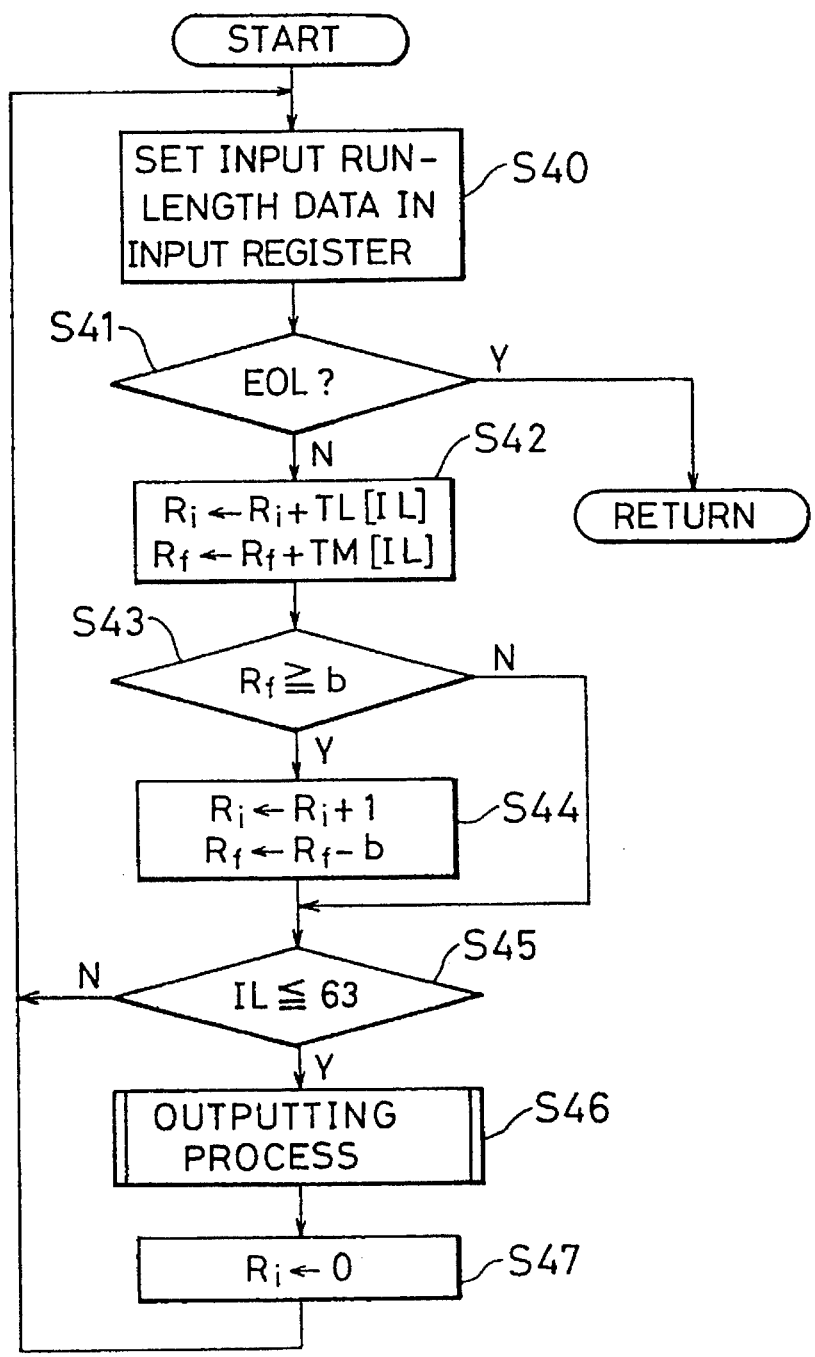
FIG. 8 is a flow chart illustrating a horizontal magnification process for changing a size of the image in a direction parallel to each scanning line.

A run-length accumulator Ri is initialized, so that zero is set in the run-length accumulator Ri before starting a process shown in FIG. 8. Referring to FIG. 8, step S40 sets an input run-length data of 1 byte in an input register IL. Then step 41 determines whether or not the data (1 byte) set in the input register IL represents an end of the line (EOL). When step 41 determines that the data represents the end of the line, the process returns to a flow shown in FIG. 4. Alternatively, step 41 determines that the data does not represent the end of the line, step S42 selects the converted run-length data TL and the converted fraction data ML corresponding to the input run-length data stored in the input register IL with reference to the run-length conversion table. Then, the converted run-length data TL and the converted fraction data ML which are selected are respectively set in the run-length accumulator Ri and a fraction accumulator Rf (Ri←Ri+TL[IL], Rf←Rf+TM[IL]). Then, step S43 determines whether or not a value in the fraction accumulator Rf is equal to or greater than the denominator "b" of the horizontal modification "a/b". When the result obtained in step S43 is YES, the run-length accumulator Ri is incremented by one (Ri←Ri+1), and the denominator "b" is subtracted from the fraction accumulator Rf (Rf←Rf–b), in step S44. Then the process proceeds to step S45. Alternatively, when the result obtained in step S43 is NO, step S44 is omitted, and the process proceeds directly to step S45.

Step S45 determines whether or not the input run-length data stored in the input register IL is equal to or less than 63. When the input run-length data is equal to or less than 63, the result obtained in step S45 is YES. In this case, step S46 carries out a process of outputting the converted run-length data. A detailed description of the outputting process will be given later. When the outputting process of the converted run-length data is finished, step s47 clears the run-length accumulator (Ri←0). Then the process returns to step S40, and the next input run-length data is processed.

Alternatively, in a case where the input run-length is greater than 63, first the input run-length data (1 byte) corresponding to the multiple of 64 is processed, and next the input run-length data (1 byte) corresponding to the number falling within a rage of 0–63 is processed. That is, after the converted run-length data TL corresponding to the multiple of 64 is stored in the run-length accumulator Ri by using the run-length conversion table, the converted run-length data TL corresponding to the number falling within a range of 0–63 is added in the run-length accumulator Ri. Then the total converted run-length data in the run-length accumulator Ri is supplied to the outputting process in step 46.

Figure 9:
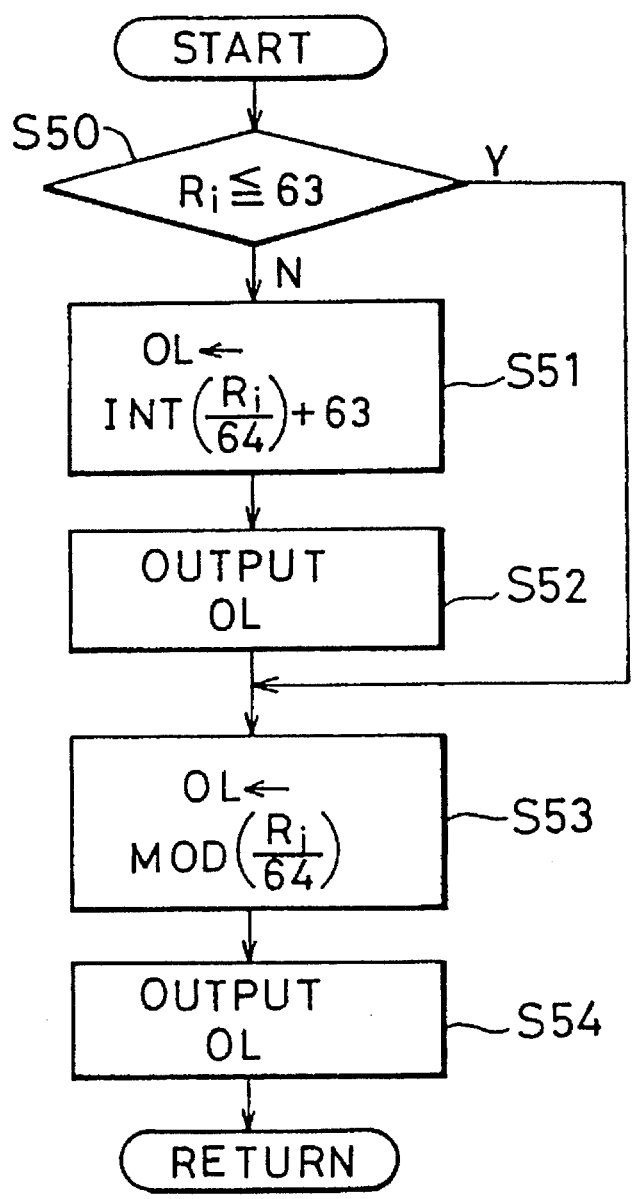
FIG. 9 is a flow chart illustrating a outputting process for outputting the run-length data.

The outputting process in step S46 is carried out in accordance with a flow chart shown in FIG. 9.

Referring to FIG. 9, step S50 determines whether or not the converted run-length data stored in the run-length accumulator Ri is equal to or greater than 63. When the result obtained in step S50 is YES, step S53 divides the converted run-length data by 64 and obtains its remainder [mod(Ri/64)]. The remainder [mod(ri/64)] is set, as an output run-length data, in an output register OL in step S53. Step S54 outputs the output run-length data stored in the output register OL. Alternatively, when step S50 determines that the converted run-length data stored in the run-length accumulator Ri is greater than 63, step S51 divides the converted run-length data by 64 and obtains its quotient [int(Ri/64)]. Further, step S51 adds 63 to the quotient [int(Ri/63)], so that the additional value [int(Ri/64)+63] is set, as a first part of an output run-length data, in the output register OL. Step 52 outputs the first part of the output run-length data stored in the output register OL. After that, step S53 divides the converted run-length data stored in the run-length accumulator Ri by 64 and obtains its remainder [mod(Ri/64)]. The remainder [mod(Ri/64)] is set, as a second part of the output run-length data, in the output register OL. Then step S54 outputs the output run-length data stored in the output register OL. In this case, the first part of the output run-length data corresponds to the multiple of 64, and the second part of the output run-length data corresponds to the number falling within a range of 0–63.

In the above output process in step S46, for example, when the converted run-length data stored in the run-length accumulator Ri is "130", the output run-length is represented by a first part "65" and a second part "2" (65, 2). In this case, the first part "65" corresponds to "128" which is a multiple of 64, and the second part "2" falls within a range of 0–63. In a case where run-length data is represented by the above first and second parts, the amount of information required for representing the run-length is decreased. Thus, a process speed at which the run-length data is processed can be improved, and an memory area in which the run-length should be stored can be decreased.

Figure 10:
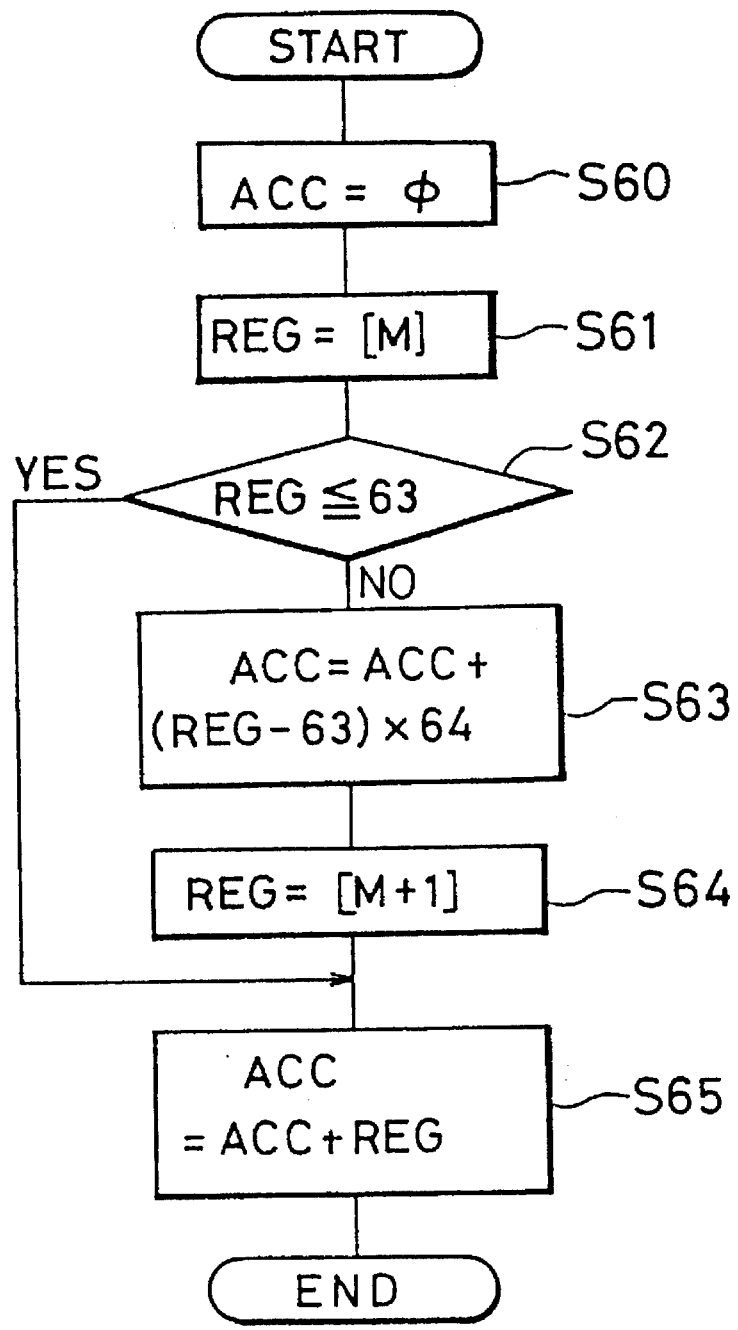
FIG. 10 is a flow chart illustrating a process for changing a form of the run-length data.

The run-length data represented by the above first part which is one of numbers (64, 65, . . . ) and the above second part falling within a range of 0–63 is converted into an actual run-length in accordance with a process including steps S60–S65 shown in FIG. 10.

The first part of the run-length data is stored in a memory at an address [M], and the second part of the run-length is stored in the memory at an address [M+1]. Referring to FIG. 10, the first part of the run-length data is converted into a first actual run-length in step S63. The first actual run-length is stored in an accumulator (Acc). The second part of the run-length data is equal to a second actual run-length. The second run-length is stored in the register (Reg) in step S64. Then step S65 adds the second actual run-length to the first actual run-length, so that the total actual run-length is obtained.

Figure 11:
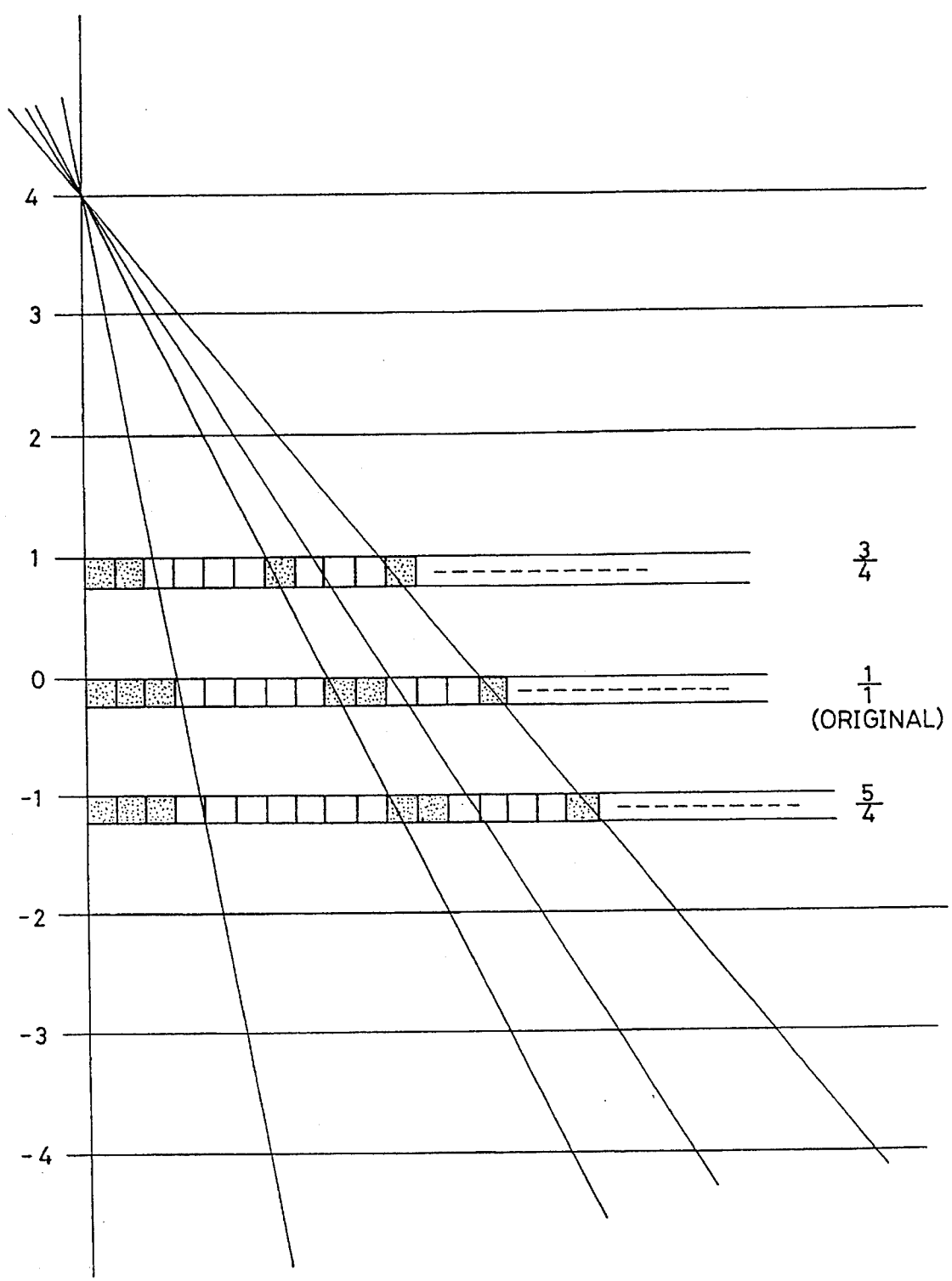
FIG. 11 is a diagram illustrating changes of a size of a line image in accordance with the magnification.

According to the above process in the image size converter, the number of lines in which the horizontal magnification process should be carried out is varied in accordance with the vertical magnification, and the run-length data for each line is varied in accordance with the horizontal magnification "a/b" as shown in FIG. 11. Thus, a size of the image is reduced or enlarged.

The horizontal magnification "a/b" can be changed for every one or for a plurality of lines. In this case, the run-length conversion table corresponding to a horizontal magnification is made for every one or for a plurality of lines.

A description will now be given of another embodiment of the present invention.

FIG. 12 shows essential blocks of a image processing unit for processing run-length data representing an image. Referring to FIG. 12, an image processing unit has a run-length memory 101, a conversion table 102, a run-length-to-byte-run-length converter 103, a byte-run-length data memory 104, a byte-run-length-to-run-length converter 105 and a controller 106 all of which are connected to each other by a bus and may be included in the image data conversion unit 1 shown in FIG. 2. The run-length memory 101 stores run-length data processed in this image processing unit. The changing table 102 indicates a quotient S and a residual Sf both of which correspond to a run-length value obtained by conversion of run-length data using a magnification. The run-length-to-byte-run-length converter 103 converts run-length data into byte-run-length data having a byte formula. The byte-run-length-data memory 104 stores byte-run-length data having the byte formula. Inversion of the byte-run-length data into run-length data is performed by the byte-run-length-to-run-length converter 105. The controller 106 controls units connected to the bus.

A description will now be given of a magnification process for changing an image representing the run-length data.

It is assumed that p1, p2, p3, . . . , and pn are positions at each of which a black pixel is changed to a white pixel or vice versa on a original image, and q1, q2, q3, . . . , and qn are positions at each of which a black pixel is changed to a white pixel or vice versa on a converted image (an enlarged image or a reduced image). It is also assumed that a magnification is n/m. The above positions are referred to as changing pixel positions. A converted run-length is a distance between changing pixel positions Which are adjacent to each other on the converted image.

The relationship between first changing pixel positions p1 and q1 on the original image and the converted image is represented by $$(n/m) \cdot p1 = q1 + qf1/m \qquad (1)$$

where q1 is a quotient of (np1/m); and (2)

qf1 is a residual of (np1/m). (3)

The relationship between the j-th changing pixel positions pj and qj on the original image and the converted image is represented by $$(n/m) \cdot pj = qj + qfj/m \quad (4)$$

The relationship between the (j+1)-th changing pixel positions p(j+1) and q(j+1) on the original image and the converted image is represented by $$(n/m) \cdot p(j+1) = q(j+1) + qf(j+1)/m \quad (5)$$

Assuming that the j-th run-length on the original image having the changing pixel positions p is represented by Rj, the relationship between the run-length Rj and a run-length Sj on the converted image is represented by $$(n/m) \cdot Rj = Sj + Sfj/m \quad (6)$$

where Sj corresponds a quotient and Sfj corresponds a residual.

In addition, the following formula (7) stands.

$$q(j+1) = (n/m)(pj + R(j+1)) \quad (7)$$

When the formulas (4) and (6) are substituted for the formula (7), the following formula (8) stands.

$$q(j+1) = qj + qfj/m + S(j+1) + Sf(j+1)/m \quad (8)$$

The run-length on a converted image is a distance between positions q(j+1) and q(j) on the converted image. The distance is defined as T(j+1). The (j+1)-th run-length T(j+1) on the converted image is represented by $$T(j+1) = q(j+1) - qj \quad (9)$$
$$= S(j+1) + (qfj + Sf(j+1))/m.$$

Since the run-length is an integer, if $$qfj + Sf(j+1) < m,$$

the run-length T(j+1) is equal to S(j+1) (T(j+1)=S(j+1)), and the residual qf(j+1) is represented by $$qf(j+1) = qfj + Sf(j+1).$$

The residual qf(j+1) is added to a run-length in the conversion process of the next run-length.

On the other hand, if $$qfj + Sf(j+1) > m,$$

the run-length T(j+1) is equal to S(j+1)+1 (T(j+1)=S(j+1)+1), and the residual qf(j+1) is represented by $$qf(j+1) = qfj + Sf(j+1) - m.$$

The residual qf(j+1) is added to a run-length in the conversion process of the next run-length.

According to the above matter, the conversion process of the run-length in accordance with the magnification (n/m) can be performed using the quotient S and the residual Sf.

A description will now be given of the run-length having the byte formula, the so called byte-run-length.

In the magnification process according to the present invention, a conversion table indicating S and Sf corresponding to each run-length which is to be converted (enlarged or reduced) using the magnification (n/m) is made, and a converted run-length is obtained, with reference to the conversion table, based on S and Sf corresponding to a value of an input run-length.

However, each run-length which is to be converted is in a range from 0 to 1728 bits in an A4 size image having a pixel density of 8/mm, and in a range from 0 to 3456 bits in an A3 size image having a pixel density of 8/mm. Thus, the size of the table indicating S and Sf depending on the magnification (n/m) and corresponding to the above values of the run-length becomes large.

In the present embodiment of the present invention, the run-length is represented by the byte formula which will be described bellow and conversion table is formed in accordance with the byte formula. As a result, the run-length can be rapidly converted by any magnification.

The byte-run-length is represented as follows.

(1) If an actual run-length is equal to or less than 63 bits, a value of the actual run-length is a value of the byte-run-length.

(2) If an actual run-length is equal to or greater than 64 bits, the byte-run-length corresponding to the actual run-length is represented by a first part which is a multiple of 64 and a second part which is a number which is equal to or less than 63. Due to converting of a value of the multiple of 64, any actual run-length can be represented by using the byte formula.

For example, a value "129" of the actual run-length is a sum of "128" which is a multiple of 64 and "1", so that the value "129" is divided into a Make up part "128" and a Terminating part "1". The Make up part "128" is converted into a byte-run-length in accordance with the following formula.

$$(\text{Make up}/64) + 63$$

That is, the Make up part "128" is converted into "65" {(=(128/64)}+63), and the actual run-length "129" is converted into a byte-run-length represented by [65]+[1], where [ ] indicates 1 byte. An 1byte data has a value in a range from 1 to 255. Thus, the byte-run-length [255] corresponds the maximum actual run-length "12288" ((255–63)×64), so that the actual run-length having any value on an image can be sufficiently represented by the byte-run-length.

When a value of the actual run-length is L, the byte-run-length BL1 of the Make up part is represented by $$BL1 = int (L/64) + 63$$

where int( ) is an integer, and the byte-run-length BL2 of the Terminating part is represented by $$BL2 = mod(L/64)$$

where mode( ) is a residual.

As has been described above, the MH code system has codes each of which corresponds to the run-length having a value in a range from 0 to 63 or a multiple of 64. In the data formula (the byte formula) in this embodiment, one byte data corresponds to a MH code. Thus, each byte data may be coded in the MH code which is to be transmitted, so that it becomes easy to code and decode the data (run-length data). In addition, since the run-length having a value less than or equal to 63 is represented by one byte, it is not necessary to have a memory having a work length of 16 or 32 bits, so that the capacity of the memory can be reduced.

In the run-length-to-byte-run-length converter 103, the actual run-length is converted into the byte-run-length as follows.

When the actual run-length has a value equal to or less than 63, lower 8 bits of the actual run-length stored in a register are set in a register (1 byte) for the byte-run-length as it is.

When the actual run-length has a value greater than 63, the bits of the actual run-length stored in the register are shifted by 6 bits in rightward, "1" is subtracted from the shifted bit data and the 7th bit is set at "1". Then, the lower 6 bits of the resistor for the actual run-length are set in the register for the byte-run-length. The shifting operation of the actuary run-length by 6 bits in the rightward corresponds to the calculation in which the run-length is divided by 64.

Figure 17B:
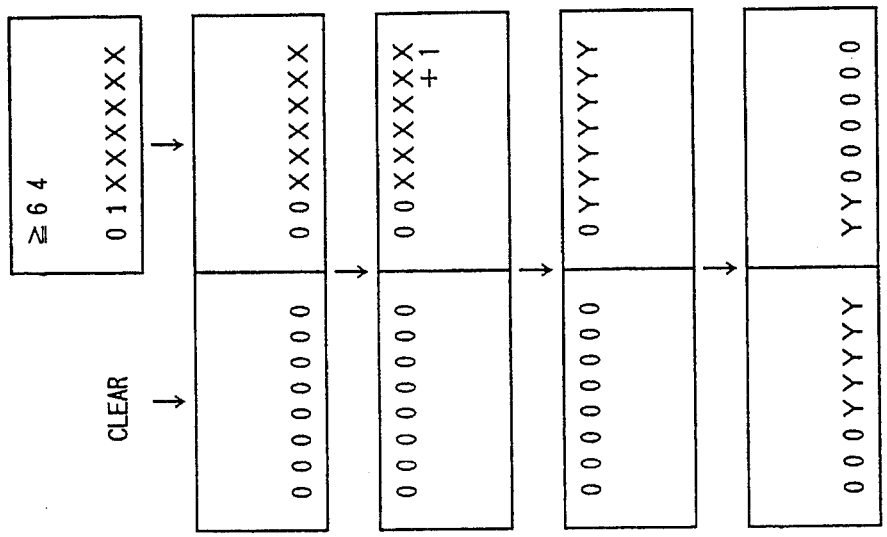
FIGS. 17A and 17B are diagrams illustrating a process for converting byte run-length data into actual run-length data.
Figure 17A:
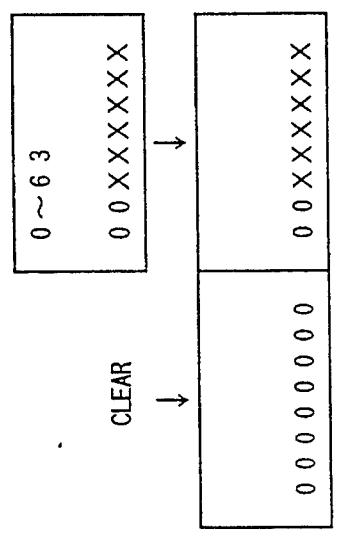

Conversion of the byte-run-length into the actual run-length in the byte-run-length-to-run-length converter 105 is in inverse relation to the operation in the run-length-to-byte-run-length converter 103. That is, when the byte-run-length has a value in a range from 0 to 63, the upper 10 bits of the resister for the actual run-length are cleared to "0", and the bits of the byte-run-length are set in the lower 6 bits of the resistor in which the actual run-length is to be stored. When the byte-run-length has a value greater than 63, the upper 10 bits of the resister for the actual run-length are cleared to "0", the bits of the byte-run-length are set in the lower 6 bits of the resistor for the actual run-length, and "1" is added to the contents of the resister for the actual run-length. After this, the bits in the resister for the actual run-length are shifted by 6 bits in leftward, so that the actual run-length into which the byte-run-length is converted is obtained in the register for the actual run-length. FIGS. 17A and 17B show the above processes for converting the byte-run-length into the actual run-length.

In particular, in FIG. 17A, the upper right box schematically indicates the byte-run-length data which is loaded into the lower bits of the run-length data register at the bottom of the figure. Also, the clearing (to 000 . . . ) of the upper bits of the run-length data register are illustrated.

In FIG. 17B, the byte-run-length data are shown in the upper right box of the figure with 01XXXXXX written therein, and are loaded into the lower bits of the run-length data register. Also, the initial clearing (to 000 . . . ) of the upper bits of the run-length data register are illustrated. The adding of 1, and the shifting to the left by six bits, are also shown in sequence in the register representations proceeding from the top of FIG. 17B to the bottom thereof.

The byte-run-length-to-run-length converter 105 is used to restore an original image from the byte-run-length data. In addition, the byte-run-length is converted into the actual run-length, and the actual run-length is then coded in accordance with the MR coding method or the MMR coding method.

A description will now be given of the conversion table.

The conversion table in this embodiment indicates the quotient S and the residual Sf which are obtained by a calculation in which each run-length, having a value in a range from 0 to 63 or a multiple of 64, is multiplied by the magnification (n/m).

Figure 13:
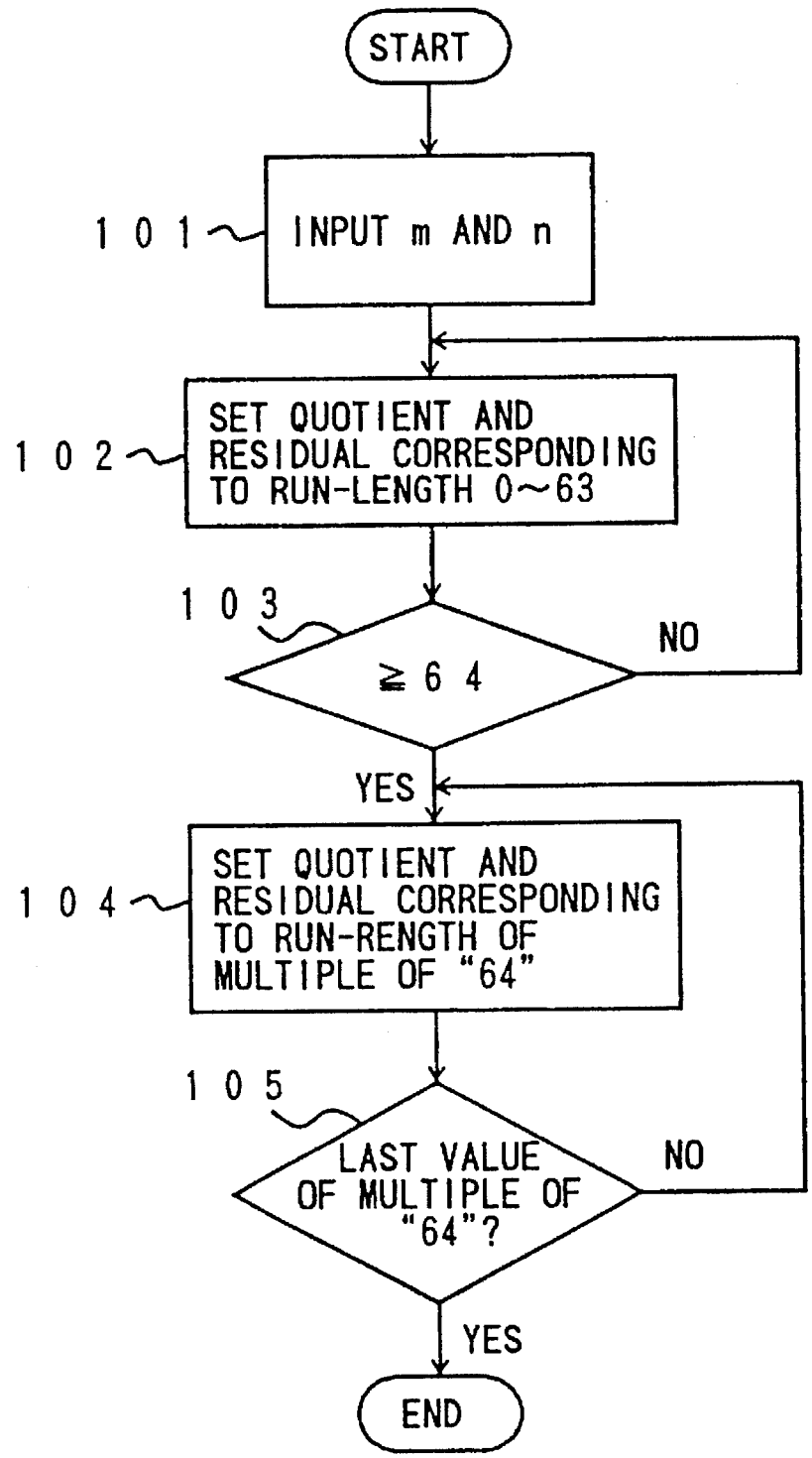
FIG. 13 is flow chart illustrating a process for making a run-length conversion table.

In this embodiment, immediately before the magnification process starts, the conversion table for a magnification is made, and the magnification process is performed with reference to the conversion table. As a result, the magnification process can be rapidly performed. FIG. 13 shows a process for making the conversion table. This process is performed by the controller 106.

Referring to FIG. 13, in step 101, a numerator "n" of the magnification (n/m) and a denominator "m" thereof are supplied from an external unit. In step 102, the controller 106 multiplies the run-length having each value in a range from 0 to 63 and the magnification (n/m) together, and the quotient S and the residual Sf are obtained. The quotient S[j] and the residual Sf[j] corresponding to the j-th run-length having a value in a range from 0 to 63 are then set in the conversion table.

When it is determined, in step 103, that a value of the run-length is equal to or greater than 64, the controller 106 multiplies, in step 104, the run-length having the value equal to a multiple of 64 (one time, twice, third time, . . . and forty times) and the magnification (n/m) together, and the quotient S and the residual Sf are obtained. The quotient S[j] and the residual Sf[j] corresponding to the j-th run-length having a value equal to a multiple of 64 are then set in the conversion table. After this, it is determined, in step 105, whether or not the run-length has a value (2560) equal to the maximum multiple of 64. Until the value of the run-length reaches the maximum multiple of 64, the above step 104 is repeated. When the run-length having the value equal to the maximum multiple of 64 has been processed, the process is completed.

FIG. 14 shows an example of a conversion table made in accordance with the above process.

This conversion table corresponds to the magnification of ⅘ (n=4 and m=5). The conversion table is provided with 104 entries (64 entries in a range from 0 to 63 and 40 entries in a range from 64 to 2560). In a case where an A4 size image having a pixel density of 8/mm is processed, the maximum value of the run-length is 1728 bits. Thus, in this case, ninety sets of the quotient S and the residual Sf (1728/64+63=90) may be set in the conversion table. The conversion table can be made by only calculations of addition and subtraction, so that the conversion table can be rapidly obtained before the magnification process starts.

In this embodiment, a two-dimensional sequential magnification process in which the magnification for each of lines arranged in a sub-scanning direction is sequentially changed can be performed.

An initial value n (0)/m (0) of the magnification and a changing rate a/b at which the magnification for each line is changed are set in the system. In this case, a magnification n(n)/m(n) for the y(n) line is calculated in accordance with the following equation.

$$n(n)/m(n) = (a/b) \cdot y(n) + n(0)/m(0)$$
$$= (am(0) \cdot y(n) + bn(0))/bm(0)$$

When y(n)=0, the magnification n(n)/m(n) for the line y(n) is equal to (am(0).0+bn(0))/bm(0). When y(n)=1, the magnification n(n)/m(n) for the line y(n) is equal to (am(0).1+bn(0))/bm(0).

Thus, in the two-dimensional sequential magnification process, a magnification n(n)/m(n) corresponding to each line identified by y(n) is obtained, the conversion table for each line is made in accordance with the magnification n(n)/m(n). According to the two-dimensional sequential magnification process, in a case where an image is displayed on a widow of a display screen, an appropriate magnification of the image can be easily found with scrolling.

Figure 15A:
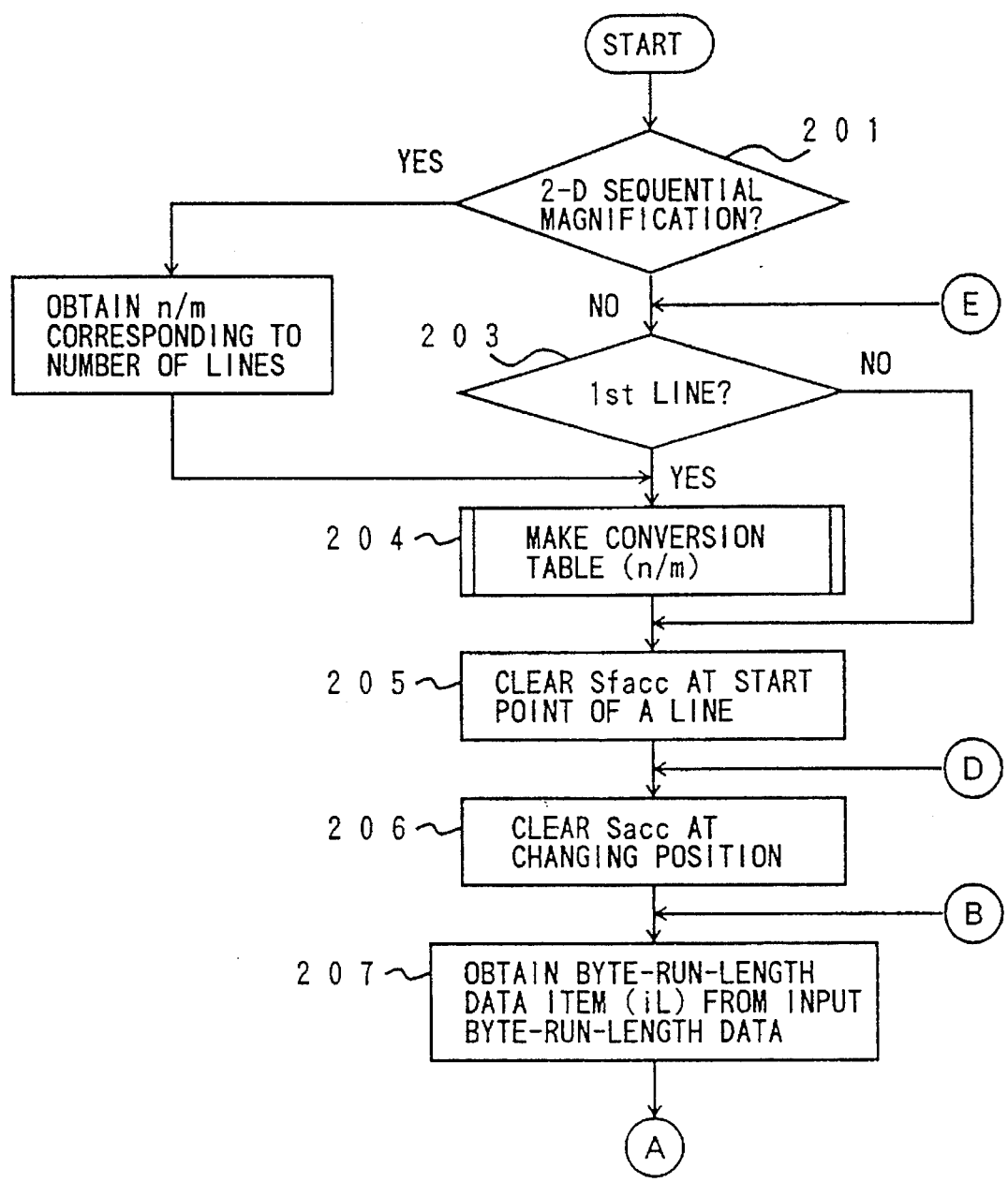
FIGS. 15A, 15B and 15C are flow charts illustrating a process for changing a size of an image represented by the run-lengths.
Figure 15B:
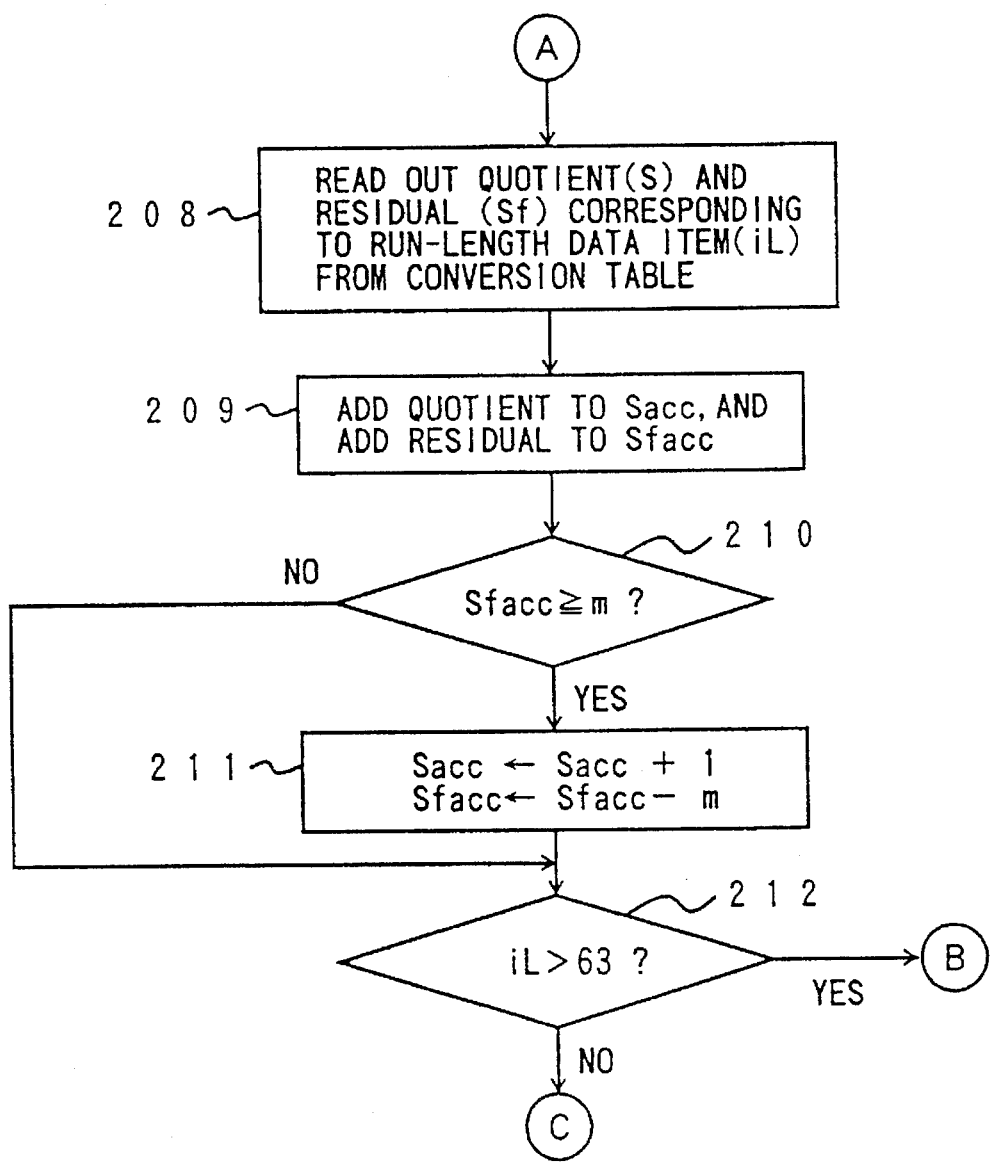
Figure 15C:
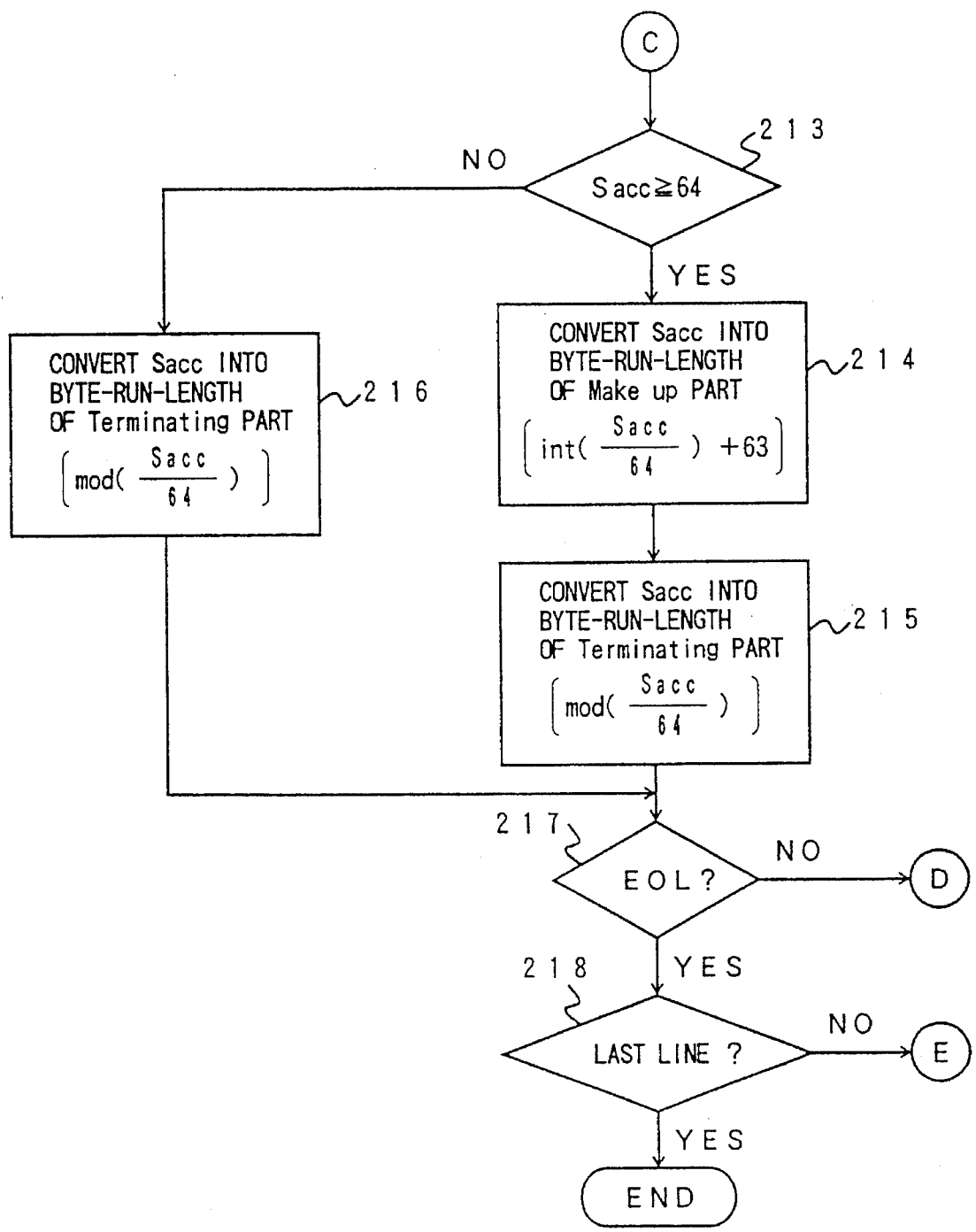
Figure 16:
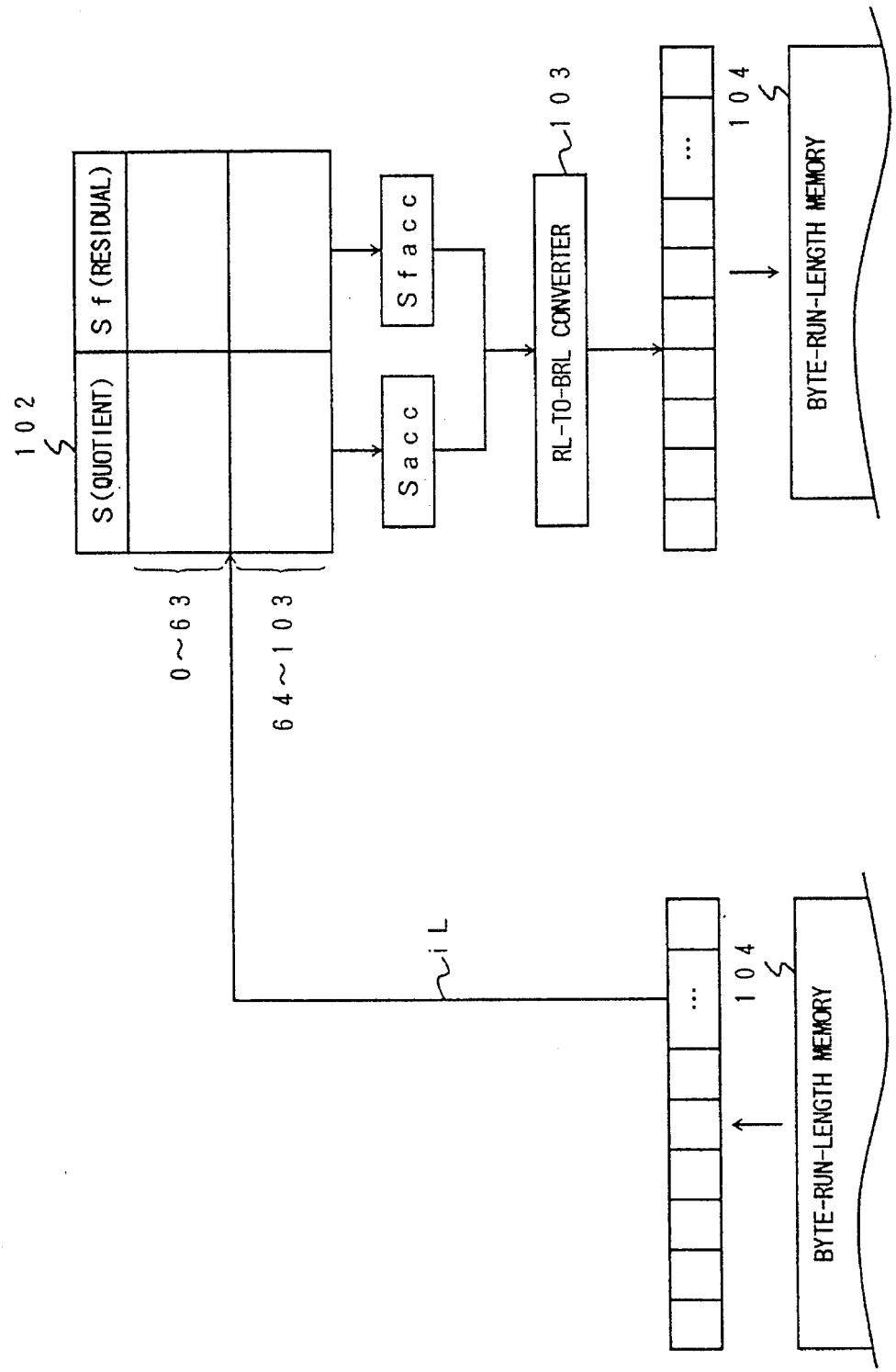
FIG. 16 is a diagram illustrating a system for changing size of an image represented by the run-lengths.

FIGS. 15A, 15B and 15C shows a magnification process for changing the byte-run-length representing an image so that the size of the image is changed. FIG. 16 shows blocks for performing the magnification process.

A description will now be given, with reference to FIGS. 15A, 15B, 15C and 16, of the magnification process.

Referring to FIG. 15A, it is determined, in step 201, whether or not the two-dimensional sequential magnification process is required. If the two-dimensional sequential magnification process is required, the magnification n/m corresponding to a present line is calculated in step 202 and the conversion table corresponding to the magnification n/m is then made, in step 204, in accordance with the process shown in FIG. 13. On the other hand, if the two-dimensional sequential is not required, it is determined, in step 203, whether or not a present line is the first line of a page. When the present line is the first line of the page, the conversion table corresponding to a given magnification n/m is made, in step 204, in accordance with the process shown in FIG. 13. At a start point of each line, a residual accumulator Sfacc is reset to "0" in step 205. At each changing position which is a start point of a run-length, a quotient accumulator Sacc is reset to "0" in step 206. After this, a byte-run-length data item (iL) which is the first byte of the input byte-run-length data is selected, in step 207, from the input byte-run-length data and the process proceeds to step 208 shown in FIG. 15B. In step 208, a quotient S[iL] and a residual Sf[iL] both of which correspond to the selected run-length data item (iL) are read out from the conversion table 102 made in step 204 as shown in FIG. 14. The quotient S[iL] and the residual Sf[iL] read out from the conversion table 102 are respectively added to values of the quotient accumulator Sacc and the residual accumulator Sfacc in step 209.

After this, it is determined, in step 210, whether or not the value of the residual accumulator Sfacc is equal to or greater than the denominator m of the magnification n/m. When the value of the residual accumulator Sfacc is equal to or greater than the denominator m, the value of the quotient accumulator Sacc is incremented by "1" and m is subtracted from the value of the residual accumulator Sfacc, in step 211. When it is determined, in step 210, that the value of the residual accumulator Sfacc is less than the denominator m, or after step 211, the process proceeds to step 212 from step 210 or 211. In step 212, it is determined whether or not the run-length data item (iL) is greater than "63". When the run-length data item (iL) is greater than 63, that is, the run-length data item (iL) has a value of the multiple of "64", the process returns to step 207. A byte-run-length data item which is the second byte of the input byte-run-length data is processed in steps 207 through 211 in the same manner as that described above. When it is determined, in step 212, that the byte-run-length item (iL) is equal to or less than "63", that is the byte-run-length item (iL) corresponds to the Terminating part, the actual run-length data, on a converted image (an enlarged image or a reduced image), has been maintained in the quotient accumulator Sacc. After this, the process proceeds to step 213 shown in FIG. 15C.

In the process shown in FIG. 15C, the actual run-length stored in the quotient accumulator Sacc is converted into the byte-run-length. This process is carried out by the run-length-to-byte-run-length converter 103.

In step 213, it is determined whether or not the value of the quotient accumulator Sacc is greater than "63". If the value of the quotient accumulator Sacc is greater than "63" (equal to or greater than "64"), the value of the quotient accumulator Sacc is converted into the byte-run-length BL1 of the Make up part in accordance with the following equation, in step 214:

$$BL1=[int(Sacc/64)+63].$$

After this, the value of the quotient accumulator Sacc is converted into the byte-run-length BL2 of the Terminating part in accordance with the following equation, in step 215:

$$BL2=[mod(Sacc/64)].$$

On the other hand, if the value of the quotient accumulator Sacc is equal to or less than 63, the value of the quotient accumulator Sacc is converted into the byte-run-length BL2 of the Terminating part in accordance with the following equation, in step 216:

$$BL2=[mod(Sacc/64)].$$

The byte-run-length BL1 of the Make up part and the byte-run-length BL2 of the Terminating part which are obtained in step 214 and 21 are stored, as output byte-run-length data, in the byte-run-length data memory 104, as shown in FIG. 16. The byte-run-length BL1 of the Terminating part obtained in step 216 is also, as the output byte-run-length, stored in the byte-run-length data memory 104.

FIG. 16 schematically illustrates the image size changing process. Proceeding clockwise from the lower left of the drawing, byte-run-length memory provides an input byte-run-length iL to conversion table 102. Conversion table 102 is arranged in columns S(quotient) and Sf(residual). The columns each include areas for lengths 0–63 and 64–103. The columns provide respective outputs to respective accumulators Sacc and Sfacc, which output the actual run-length to the RL-to-BRL converter 103. Finally, the output byte-run length is provided by converter 103 to the byte-run-length memory 104.

After this, the above process (steps 207 through 217) is repeated until it is determined, in step 217, that an tail end of each line has been detected. Furthermore, the above process (steps 203 through 218) is repeated until it is determined, in step 218, that a line positioned at an end of a page has been detected.

The byte-run-length data stored in the byte-run-length data memory 104 is, for example, coded into the MH code byte by byte, and is transmitted to a facsimile machine.

Figure 18:
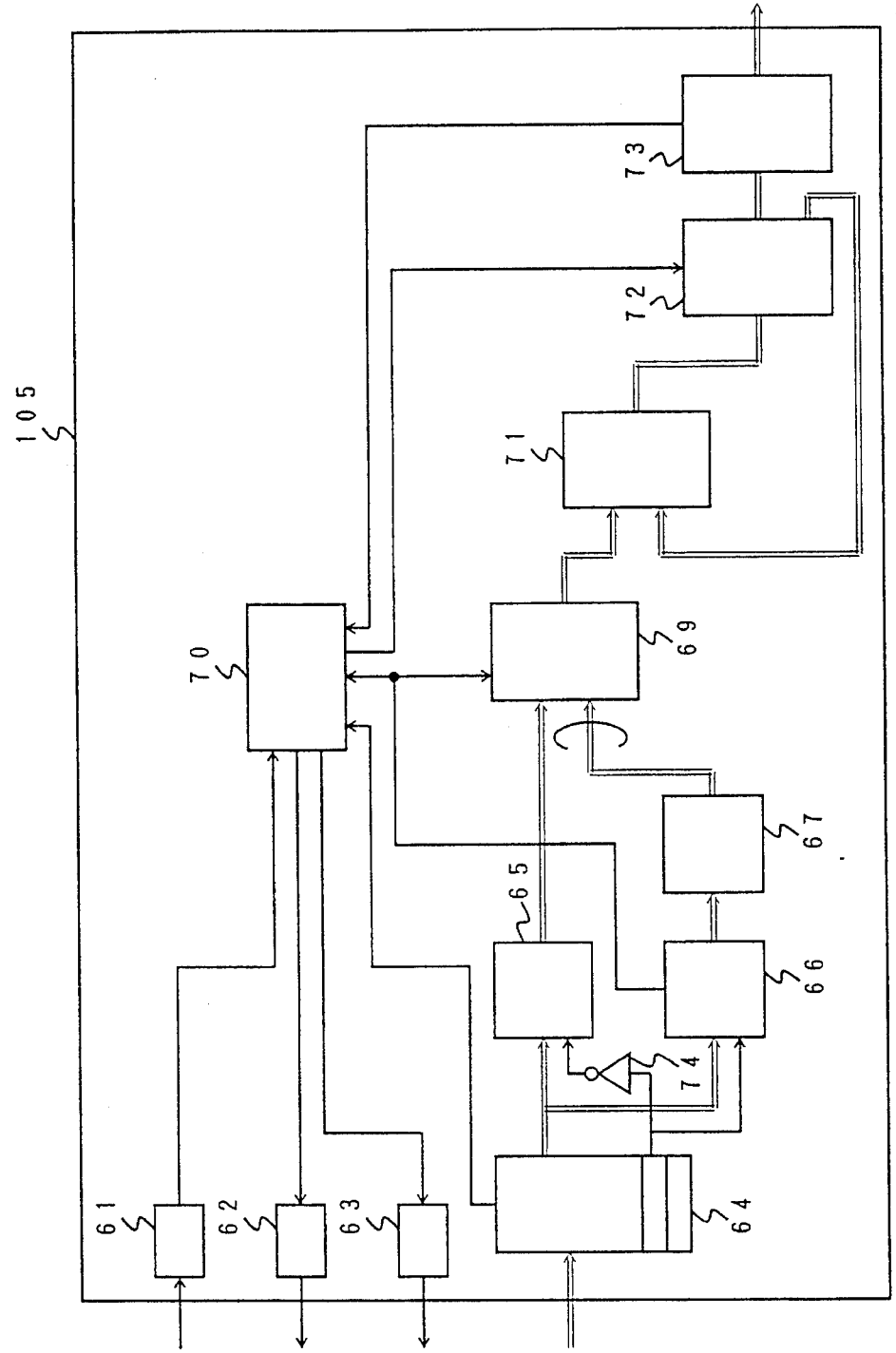
FIG. 18 is a block diagram illustrating an example of a structure of a byte-run-length-to-run-length converter.

The byte-run-length-to-run-length converter 105 may be formed of hardware as shown in FIG. 18.

Referring to FIG. 18, the byte-run-length-to-run-length converter 105 has an control register 61, a first status register 62, a second status register 63, an input buffer 64, a terminating part register 65, a make up part register 66, a conversion unit 67, a temporary register 69, a control unit 70, an adding register 71, a actual run-length register 72 and an output buffer 73. Control data for resetting the actual run-length register 72 is stored in the control register 61. A bit indicating whether or not data can be input is set in the first status register 62. When the input buffer 64 is empty, the bit (a high level) indicating a ready state is set in the first status register 62. A bit indicating whether or not data can be output is set in the second status register 63. After the actual-run-length is obtained based on the Terminating byte-run-length and the data supplied from the actual run-length register 72 is set in the output buffer 73, a bit (a high level) indicating a ready state is set in the second status register 63. The byte-run-length having one byte is set in the input buffer 64. The 7-th bit of the input buffer 64 is supplied, as a control bit, to the terminating part register 65 via an inverter 74. The 7-th bit of the input buffer 64 is directly supplied, as a control bit, to the make up part register 66.

The byte-run-length stored in the input buffer 64 is set in both the terminating part register 65 and the make up part register 66. When the 7-th bit of the byte-run-length stored in the input buffer 64 is equal to "0", the byte-run-length set in the terminating part register 65 is supplied to the temporary register 69 in accordance with the control bit. On the other hand, when the 7-th bit of the byte-run-length stored in the input buffer 64 is equal to "1", the byte-run-length set in the make up part register 66 is supplied to the conversion unit 67 in accordance with the control bit. The conversion unit 67 increments the byte-run-length supplied from the make up part register 66 by "1" and shifts it by 6 bits. The result obtained by the conversion unit 67 is supplied to the temporary register 69. That is, the actual byte-run-length is stored in the temporary register 69. The control unit 70 controls operations in the byte-run-length-to-run-length converter 105 and performs an interface between sequential control processes and external signals. The adding register 71 adds the contents of the temporary register 69 to the actual run-length in the actual run-length register 72 and supplies the result to the actual run-length register 72. After the actual run-length register 72 supplies the adding result of the actual run-length to the output buffer 73, the actual run-length register 72 is reset.

Figure 19:
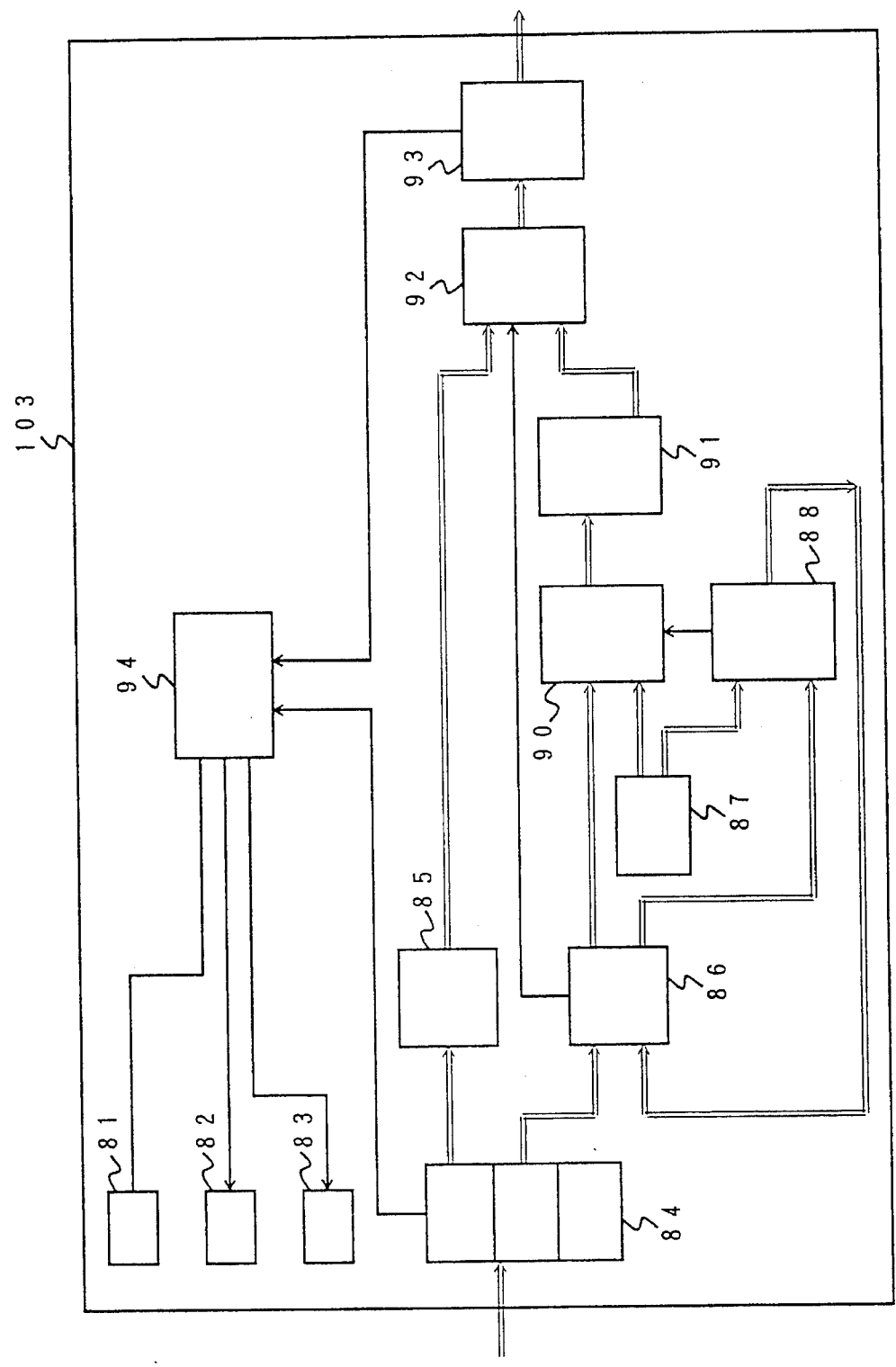
FIG. 19 is a block diagram illustrating an example of a structure of a run-length-to-byte-run-length converter.

The run-length-to-byte-run-length converter 103 may be formed of hardware as shown in FIG. 19.

Referring to FIG. 19, the run-length-to-byte-run-length converter 103 has an control register 81, a first status register 82, a second status register 83, an input buffer 84, a terminating part register 85, a make up part register 86, a maximum value register 87, a determination block 88, a make up part selecting register 90, a conversion unit 91, a selector 92, an output buffer 93 and a control unit 94. Control data for resetting internal registers is stored in the control resistor 81. A bit indicating whether or not data (the actual run-length) can be input is set in the first status register 82. When the input buffer 84 is empty, the bit (a high level) indicating a ready state is set in the first status register 82. In other cases, the bit (a low level) indicating a busy state is set in the first status register 82. A bit indicating whether or not data can be output is set in the second status register 83. In a process for converting the actual run-length into the byte run-length, when the byte-run-length can be output, the bit (a high level) indicating a ready state is set in the second status register 83. The byte-run-length having 16 bits is temporarily stored in the input buffer 84.

The terminating part register 85 stores lower 6 bits (the terminating part of the run-length) of the actual run-length in the input buffer 84. The actual run-length set in the input buffer 84 is shifted rightward by 6 bits and the shifted data is stored in the make up part register 86. This shifting operation corresponds to a calculation in which the actual run-length is divided by "64". The data in the make up part register 86 is supplied to the determination block 88. The maximum value (e.g. "40"=2560/64) of the make up part is stored in the maximum value register 77. The determination block 88 determines whether or not the data supplied from the make up part register 86 is greater than the maximum value (e.g. "40"). When the determination block 88 determines that the data is greater than maximum value, the difference value between the data and the maximum value returns from the determination block 88 to the make up part register 86. The differential value set in the make up part register 86 is supplied to the determination part 88 again. This operation of the determination block 88 and the make up part register 86 is repeated until the determination block 88 determines that the data is not greater than the maximum value. When the determination block 88 determines that the data stored in the make up register 86 is greater than the maximum value, the make up part selecting register 90 selects the maximum value in the maximum value register 87 and supplies it to the conversion unit 91. On the other hand, when the determination block 88 determines that the data is not greater than the maximum value, the make up part selecting register 90 selects the data in the make up part register 86 and supplies it to the conversion unit 91. The conversion unit 91 decrements the data supplied from the make up part selecting register 90 by "1" and turns the 7-th bit of the data on. When the data stored in the make up part register is not "0", the selector 92 selects the data obtained by the conversion unit 91 and supplies it, as the byte-run-length of the make up part, to the output buffer 93. On the other hand the data stored in the make up part register is "0". the selector 92 selects the data stored in the terminating part register 85 and supplies it, as the byte-run-length of the terminating part, to the output buffer 93. The control unit 94 controls operations in the run-length-to-byte-run-length converter 103.

According to the embodiments described above, in the magnification process, since image data is represented by the byte run-length data byte by byte, the image data can be easily process by a general digital processing unit in which the data is processed byte by byte. Furthermore, the capacity of the memory in which the image data is to be stored can be decreased. In addition, since each byte of the byte-run-length data corresponds to the MH code, the coding of the image data can be effectively performed.

The conversion table can be rapidly made, so that the magnification process can be rapidly performed.

The present invention is not limited to the aforementioned embodiments, and variations and modifications may be made without departing from the scope of the claimed invention.

What is claimed is:

1. An image processing system for processing an image represented by run-lengths, said system comprising:

A) converting means including:
1) first means for, when a run-length is less than a base number which is an n-th power of "2" where n is an integer, representing the run-length by run-length data using a predetermined formula; and
2) second means for, when a run-length is equal to or greater than the base number, using the predetermined formula for representing the run-length by run-length data constituting:
   a) a first part corresponding to a multiple of the base number; and
   b) a second part corresponding to a value less than the base number; and B) processing means, connected to the converting means, for processing the first and second parts of the run-length data obtained by said first means or said second means in order to code the data.

2. The image processing system as claimed in claim 1, wherein the predetermined formula is a formula in which each value is represented by one byte.

3. The image processing system as claimed in claim 1, wherein the base number is 64.

4. The image processing system as claimed in claim 1 further comprising:

size changing means for changing a size of an original image represented by run-length data obtained by said first means and said second means.

5. The image processing system as claimed in claim 4, wherein said size changing means comprises:

a conversion table indicating relationships between run-lengths on the original image and run-lengths on a converted image;

conversion means for converting, with reference to said conversion table, a run-length on an original image into a run-length on the converted image, the run-length on the converted image being processed by said first means or said second means.

6. The image processing system as claimed in claim 5, wherein said conversion table has a first area on which each run-length having a value less than the base number on the original image is indicated and a second area on which each run-length having a value corresponding to a multiple of the base number on the original image is indicated.

7. The image processing system as claimed in claim 6, wherein said conversion table indicates a pair of a quotient and a residual both of which are obtained by multiplying a value of each run-length on the original image and a magnification (a/b) supplied from an external unit, the quotient corresponding to a value of the run-length on the converted image.

8. The image pressing system as claimed in claim 4, wherein said size changing means comprises:

table making means for making, based on a magnification data (a/b) supplied from an external unit, a conversion table indicating relationships between run-lengths on the original image and run-lengths on a converted image;

conversion means for converting, with reference to said conversion table, a run-length on an original image into a run-length on the converted image, the run-length on the converted image being processed by said first means or said second means.

9. The image processing system as claimed in claim 8, wherein said conversion table has a first area on which each run-length having a value less than the base number on the original image is indicated and a second area on which each run-length having a value corresponding to a multiple of the base number on the original image is indicated.

10. The image processing system as claimed in claim 9, wherein said conversion table indicates a pair of a quotient and a residual both of which are obtained by multiplying a value of each run-length on the original image and the magnification (a/b), the quotient corresponding to a value of the run-length on the converted image.

11. The image processing system as claimed in claim 8, wherein said table making means makes the conversion table every time the magnification data (a/b) is changed.

12. The image processing system as claimed in claim 11, wherein the magnification data (a/b) is changed every time a line to be processed on the original image is changed.

13. An image data converting system, comprising:

1) first storage means for storing run-length data L which was converted from image data;

2) converting means, connected to the first storage means, for converting the run-length data L stored in the storage means into byte-run-length data represented by:

a) MOD(L/64) if the run-length data L is less than or equal to 63; and by
      b) INT(L/64)+63 and MOD(L/64) if the run-length data L is greater than 63;
      wherein:
         a) MOD(L/64) is a remainder after dividing L by 64; and
         b) INT(L/64) is a quotient value obtained after dividing L by 64;

3) second storage means, connected to the converting means, for storing the byte-run-length data; and 4) processing means, connected to the second storage means, for processing the byte-run-length data stored in the second storage means in order to code the byte-run-length data.

14. An image size changing system for changing a size of an input image, the system comprising:

1) first storage means for storing run-length data L which was converted from image data;

2) first converting means, connected to the first storage means, for converting the run-length data L stored in the storage means into byte-run-length data represented by:

a) MOD(L/64) if the run-length data L is less than 63; and by
      b) INT(L/64)+63 and MOD(L/64) if the run-length data L is greater than 63;
      wherein:
         a) MOD(L/64) is a remainder after dividing L by 64; and
         b) INT(L/64) is a quotient value obtained after dividing L by 64;

3) second storage means, connected to the converting means, for storing the byte-run-length data;

4) a conversion table indicating a correspondence among run-length data and byte-run-length data and pairs of quotients and residuals, wherein:

4') a quotient and a residual of each of the pairs is obtained by multiplying a value of the run-length data and a magnification data (a/b); and 5) second converting means, connected to the conversion table, for converting the byte-run-length data stored in the first storage means into run-length data on an image having a size which is (a/b) times as large as a size of the input image.

* * * * *

UNITED STATES PATENT AND TRADEMARK OFFICE
CERTIFICATE OF CORRECTION

PATENT NO. : 5,488,486
DATED : January 30, 1996
INVENTOR(S) : Hiromasa SHIMIZU

It is certified that error appears in the above-indentified patent and that said Letters Patent is hereby corrected as shown below:

At column 10, line 18, delete "Out" and insert --out--.

At column 11, line 11, delete "s47" and insert --S47--.

At column 11, line 18, delete "rage" and insert --range--.

At column 11, line 65, delete "an" and insert --a--.

At column 12, line 29, delete "a" and insert --an--.

At column 12, line 60, delete "Which" and insert --which--.

At column 14, line 13, delete "bellow" and insert --below--.

At column 14, line 37, delete "{(=(128/64)}+63)" and insert --{=(128/64)+63}--.

At column 14, line 39, delete "1byte" and insert --1-byte--.

At column 15, line 35, delete "." after the word "figure" and insert --:--.

At column 16, line 56, delete "widow" and insert --window--.

At column 17, line 42, insert --,-- after the word "is".

At column 18, line 27, delete "an" and insert --a--.

At column 18, line 38, delete "an" and insert --a--.

UNITED STATES PATENT AND TRADEMARK OFFICE
CERTIFICATE OF CORRECTION

PATENT NO. : 5,488,486
DATED : January 30, 1996
INVENTOR(S) : Hiromasa SHIMIZU

It is certified that error appears in the above-indentified patent and that said Letters Patent is hereby corrected as shown below:

At column 18, line 42, delete "a" and insert --an--.

At column 19, line 18, delete "an" and insert --a--.

At column 20, line 7, delete "the" before the word "selector" and insert --The--.

Signed and Sealed this

Twentieth Day of August, 1996

Attest:

BRUCE LEHMAN

Attesting Officer          Commissioner of Patents and Trademarks